(12) United States Patent
Nakao et al.

(10) Patent No.: US 11,190,058 B2
(45) Date of Patent: Nov. 30, 2021

(54) NON-CONTACT POWER SUPPLY DEVICE AND METHOD FOR ABNORMAL STOP

(71) Applicant: Omron Corporation, Kyoto (JP)

(72) Inventors: Goro Nakao, Inazawa (JP); Yusuke Kawai, Ichinomiya (JP); Toshiyuki Zaitsu, Kyotanabe (JP); Atsushi Nomura, Ichinomiya (JP)

(73) Assignee: Omron Corporation, Kyoto (JP)

( * ) Notice: Subject to any disclaimer, the term of this patent is extended or adjusted under 35 U.S.C. 154(b) by 49 days.

(21) Appl. No.: 16/612,215

(22) PCT Filed: May 25, 2018

(86) PCT No.: PCT/JP2018/020242
§ 371 (c)(1),
(2) Date: Nov. 8, 2019

(87) PCT Pub. No.: WO2018/221428
PCT Pub. Date: Dec. 6, 2018

(65) Prior Publication Data
US 2021/0143676 A1 May 13, 2021

(30) Foreign Application Priority Data

Jun. 2, 2017 (JP) .............................. JP2017-110334
Mar. 13, 2018 (JP) .............................. JP2018-045506

(51) Int. Cl.
*H02J 50/80* (2016.01)
*H02J 50/12* (2016.01)
(Continued)

(52) U.S. Cl.
CPC .............. *H02J 50/80* (2016.02); *H02J 50/12* (2016.02); *H02J 50/60* (2016.02); *H04B 5/0037* (2013.01); *H04B 5/0093* (2013.01)

(58) Field of Classification Search
CPC . H02J 50/00; H02J 50/12; H02J 50/80; H04B 5/00
See application file for complete search history.

(56) References Cited

U.S. PATENT DOCUMENTS 5,768,111 A * 6/1998 Zaitsu ..................... H02M 3/28
310/316.01
5,805,432 A * 9/1998 Zaitsu ..................... H02M 1/34
363/16
(Continued)

FOREIGN PATENT DOCUMENTS

| JP | 2013-126307 A | 6/2013 |
| JP | 2015042051 A | 3/2015 |
| JP | 2015-173587 A | 10/2015 |

OTHER PUBLICATIONS

International Search Report issued in PCT/JP2018/020242 dated Jul. 17, 2018 (3 pages).
(Continued)

*Primary Examiner* — Adi Amrany
(74) *Attorney, Agent, or Firm* — Osha Bergman Watanabe & Burton LLP

(57) ABSTRACT

A power receiving device 3 of a non-contact power supply device 1 has: a resonant circuit 20 having a receiving coil 21 for receiving power from a power transmission device 2; and a rectifier circuit 24 for rectifying power output from the resonant circuit 20. The power transmission device 2 has: a transmission coil 14 for supplying power to the power receiving device 3; a power supply circuit 10 for supplying AC power having an adjustable switching frequency to the power transmission coil 14; and a control circuit 17 that stops the power supply from the power supply circuit 10 to the transmission coil 14 when the non-contact power supply device 1 does not perform a constant voltage output opera-
(Continued)

tion even if the switching frequency is changed over a predetermined frequency range.

8 Claims, 21 Drawing Sheets

(51) Int. Cl.
*H02J 50/60* (2016.01)
*H04B 5/00* (2006.01)

(56) References Cited

U.S. PATENT DOCUMENTS

| | | | | |
|---|---|---|---|---|
| 5,969,954 | A * | 10/1999 | Zaitsu | H02M 3/337 |
| | | | | 363/16 |
| 9,561,730 | B2 * | 2/2017 | Widmer | B60L 50/66 |
| 2008/0303479 | A1 * | 12/2008 | Park | H02J 50/90 |
| | | | | 320/108 |
| 2011/0169446 | A1 * | 7/2011 | Kondo | H02J 50/10 |
| | | | | 320/108 |
| 2014/0203774 | A1 * | 7/2014 | Sawayanagi | H02J 50/10 |
| | | | | 320/108 |
| 2015/0236518 | A1 | 8/2015 | Matsumoto et al. | |
| 2016/0043562 | A1 * | 2/2016 | Lisi | H02J 7/0047 |
| | | | | 307/104 |
| 2016/0064951 | A1 * | 3/2016 | Yamamoto | H02J 50/20 |
| | | | | 307/104 |
| 2016/0226312 | A1 * | 8/2016 | Suzuki | H02J 7/025 |
| 2021/0135495 | A1 * | 5/2021 | Nakao | H02J 50/80 |
| 2021/0143675 | A1 * | 5/2021 | Nakao | H02J 50/00 |

OTHER PUBLICATIONS

Written Opinion of the International Searching Authority issued in PCT/JP2018/020242 dated Jul. 17, 2018 (4 pages).
Watanabe et al., "Bidirectional Contactless Power Transfer System expandable from Unidirectional Systems", The transactions of the Institute of Electrical Engineers of Japan. D, IEEJ Transactions on Industry Applications, vol. 133, No. 7, pp. 707-713, 2013 (3 pages).
Komasaki et al., "Methods for Detecting Foreign Metallic Materials in the Air Gap of Contactless Battery Charger for Electric Vehicles", IEE-Japan Industry Applications Society Conference, 2012 (6 pages).

* cited by examiner

FIG. 15
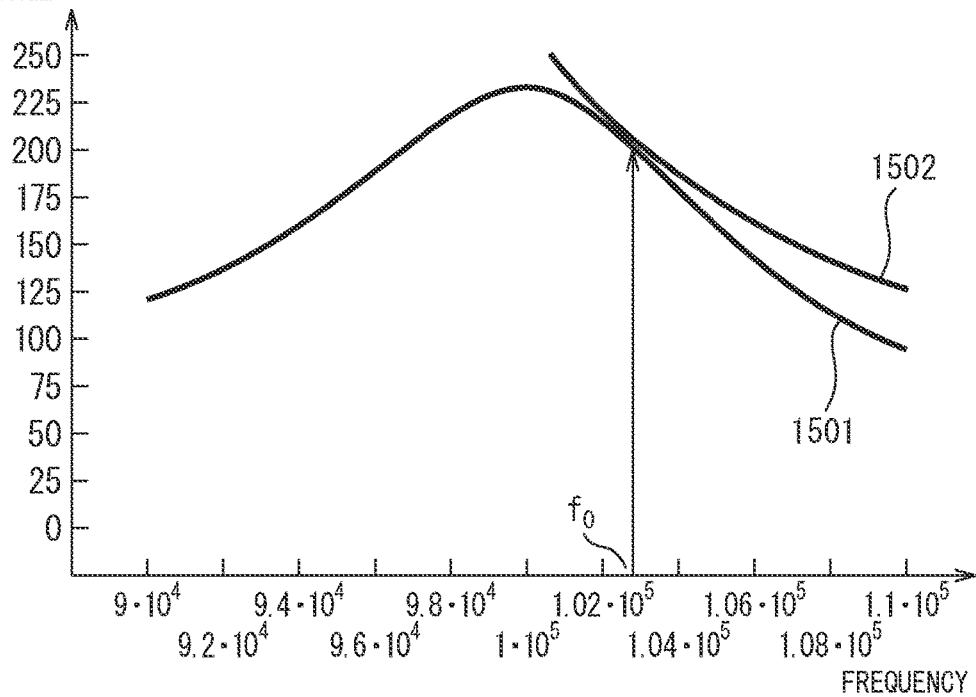
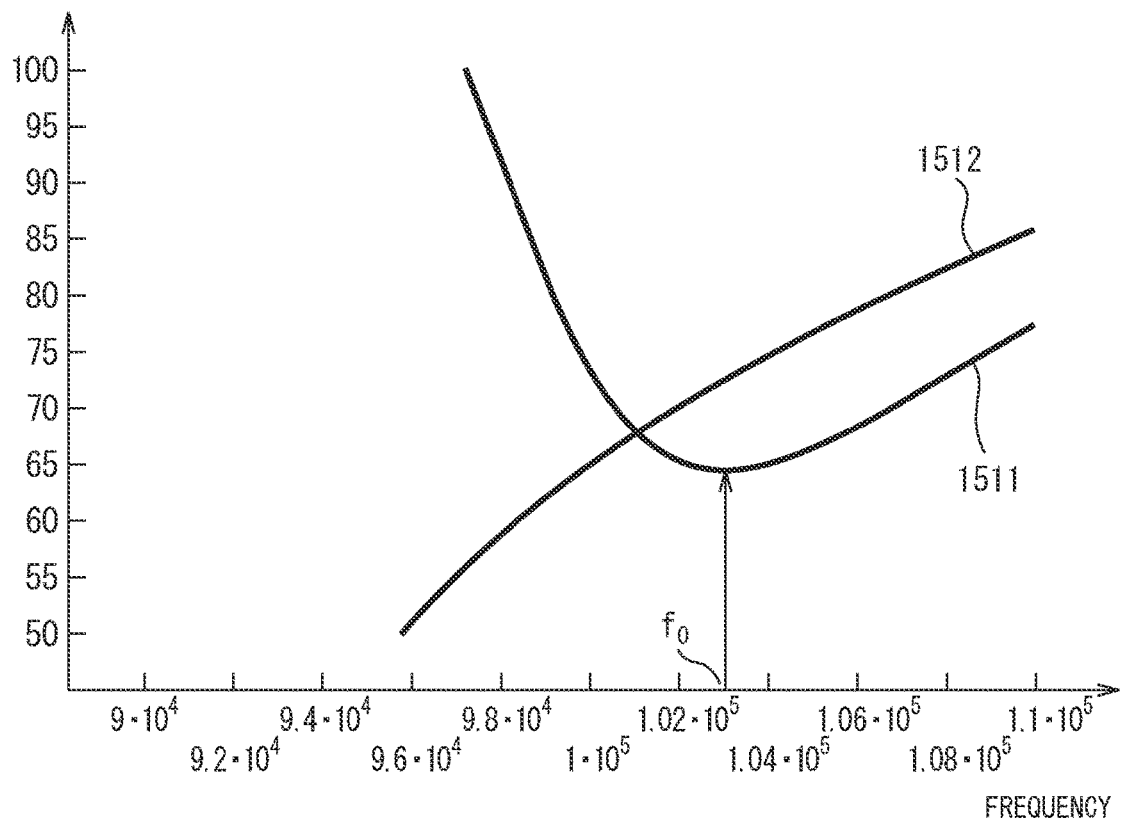

NON-CONTACT POWER SUPPLY DEVICE AND METHOD FOR ABNORMAL STOP

FIELD

The present invention relates to a non-contact power supply device and a method for abnormal stop in the non-contact power supply device.

BACKGROUND

Conventionally, technologies for transmitting electric power through space without using metal contacts or the like, or so-called non-contact power supply (also called wireless power supply) technologies have been studied.

As one of non-contact power supply technologies, a method of supplying power by electromagnetic induction is known. In the method of supplying power by electromagnetic induction, a series-primary parallel-secondary capacitors method (hereinafter referred to as an SP method) is used (see, for example, NPL 1). According to the SP method, a capacitor is connected in series with a transmission coil serving as a part of a transformer on the primary side (power transmission side), and a capacitor is connected in parallel with a reception coil serving as another part of the transformer on the secondary side (power reception side).

In the SP method, since the resonance circuit constituted by the reception coil and the capacitor on the power reception side causes parallel resonance, the output from the resonance circuit is constant current output. Thus, it is generally more difficult to perform control in the SP method than in a series-primary series-secondary capacitors method (hereinafter referred to as an SS method), in which output on the power reception side is constant voltage output. This is because electronic appliances are generally controlled by constant voltage.

In addition, a technique of, in the SP method, disposing a reactor that is connected in series with the coil in the resonance circuit on the power reception side has been proposed (see, for example, NPL 1 and PTL 1). Note that the method using such a technique is sometimes referred to as an SPL method. The method is also referred to as the SPL method herein.

In such various types of non-contact power supply devices, a foreign object made of metal sometimes accidentally intrudes between the transmission coil on the power transmission side and the reception coil on the power reception side. In such a case, the foreign object is heated by induction heating during power transmission, as a result, a malfunction such as ignition of the foreign object or an occurrence of deformation of the cover of the device, may occur. Thus, a technique for detecting a foreign object made of metal that has intruded between the transmission coil and the reception coil has been proposed (see, for example, NPL 2).

CITATION LIST

Patent Literature

[PTL 1] Japanese Unexamined Patent Publication (Kokai) No. 2015-42051

Non-Patent Literature

[NPL 1] Watanabe et al., "Bidirectional Contactless Power Transfer System expandable from Unidirectional Systems", The transactions of the Institute of Electrical Engineers of Japan. D, IEEJ Transactions on Industry Applications, Vol. 133, No. 7, pp. 707-713, 2013

[NPL 2] Komasaki et al., "Methods for Detecting Foreign Metallic Materials in the Air Gap of Contactless Battery Charger for Electric Vehicles", IEE-Japan Industry Applications Society Conference, 2012

SUMMARY

Technical Problem

In NPL 2, as foreign object detection methods, three methods, namely, (I) a method of comparing a transformer efficiency estimated from a voltage ratio between the transmission coil and the reception coil with an actual efficiency, (II) a method of comparing current values when a constant voltage is applied to the transmission coil in the state where the device on the power reception side is removed, and (III) a method of sampling transmission loss at a fixed period and comparing sampled transmission loss values, are proposed. Among the three methods, the methods (I) and (II) are methods for detecting a foreign object that intruded before starting power transmission, and the method (III) is a method for detecting a foreign object that has intruded during power transmission. However, the methods are on the basis of the assumption that the coupling coefficient between the transmission coil and the reception coil does not change, and therefore, when the coupling coefficient changes during power transmission due to, for example, change in a relative positional relationship between the device on the power transmission side and the device on the power reception side, it is impossible to discriminate whether a foreign object has intruded or the coupling coefficient has changed.

Accordingly, an object of the present invention is to provide a non-contact power supply device that is capable of preventing a malfunction due to a foreign object that has intruded between the transmission coil and the reception coil from occurring even when the coupling coefficient between the transmission coil of the device on the power transmission side and the reception coil of the device on the power reception side changes.

Solution to Problem

As an embodiment of the present invention, a non-contact power supply device including a power transmission device and a power reception device to which power is transmitted from the power transmission device without contact is provided. In the non-contact power supply device, the power reception device includes a resonance circuit that includes a reception coil that receives power from the power transmission device and a rectification circuit that rectifies power output from the resonance circuit, and the power transmission device includes a transmission coil that supplies power to the power reception device, a power supply circuit that supplies AC power having an adjustable switching frequency to the transmission coil, and a control circuit that stops power supply from the power supply circuit to the transmission coil when the non-contact power supply device does not perform a constant voltage output operation even when switching frequency of the AC power supplied from the power supply circuit to the transmission coil is changed over a predetermined frequency range.

By having such a configuration, the non-contact power supply device is capable of preventing a malfunction due to a foreign object that has intruded between the transmission coil and the reception coil from occurring even when a coupling coefficient between the transmission coil of the device on the power transmission side and the reception coil of the device on the power reception side changes.

In the non-contact power supply device, the power reception device preferably further includes a coil that is connected between the resonance circuit and the rectification circuit in series with the reception coil and the resonance circuit of the power reception device preferably further includes a resonance capacitor that is connected in parallel with the reception coil, and the control circuit of the power transmission device preferably controls the power supply circuit in such a way that AC power having a switching frequency at which the transmission coil does not resonate is supplied to the transmission coil.

By having such a configuration, the non-contact power supply device can determine whether or not a foreign object has intruded between the transmission coil and the reception coil, based on whether or not the constant voltage output operation is performed, the non-contact power supply device is capable of accurately determining whether or not a foreign object has intruded between the transmission coil and the reception coil.

Alternatively, in the non-contact power supply device, the resonance circuit of the power reception device preferably further includes a resonance capacitor that is connected in series with the reception coil.

By having such a configuration, the non-contact power supply device can determine whether or not a foreign object has intruded between the transmission coil and the reception coil, based on whether or not the constant voltage output operation is being performed, the non-contact power supply device is capable of accurately determining whether or not a foreign object has intruded between the transmission coil and the reception coil.

In the non-contact power supply device, the power reception device preferably further includes a voltage detection circuit that measures output voltage of power output from the resonance circuit and obtains a measured value of the output voltage, a constant voltage determination circuit that determines, based on a measured value of the output voltage, whether or not the non-contact power supply device is performing the constant voltage output operation and whether or not a measured value of output voltage from the resonance circuit falls within a predetermined allowance range of voltage, and a transmitter that transmits a signal including determination information indicating whether or not the non-contact power supply device is performing the constant voltage output operation and whether or not a measured value of the output voltage falls within the predetermined allowance range of voltage to the power transmission device. On the other hand, the power transmission device preferably further includes a receiver that receives the signal including the determination information and the control circuit of the power transmission device preferably stops power supply from the power supply circuit to the transmission coil when the control circuit of the power transmission device does not receive the determination information indicating that the non-contact power supply device is performing the constant voltage output operation even when switching frequency of the AC power supplied from the power supply circuit to the transmission coil is changed over the predetermined frequency range.

By having such a configuration, the non-contact power supply device is capable of securely preventing a malfunction due to a foreign object that has intruded between the transmission coil and the reception coil from occurring.

In this case, the constant voltage determination circuit of the power reception device preferably calculates a change amount of measured values of the output voltage during a lapse of a predetermined period of time, and the transmitter of the power reception device preferably includes the change amount of measured values of the output voltage in the determination information. When the change amount of measured values of the output voltage included in the determination information indicates that the measured values of the output voltage increase when switching frequency of the AC power supplied from the power supply circuit to the transmission coil is changed in such a way as to be raised by a predetermined amount, the control circuit of the power transmission device preferably stops power supply from the power supply circuit to the transmission coil.

By having such a configuration, the non-contact power supply device is capable of securely preventing a malfunction due to a foreign object that has intruded between the transmission coil and the reception coil from occurring.

In addition, in the non-contact power supply device, when measured values of the output voltage become substantially constant even when resistance of a circuit connected to the resonance circuit is changed, the constant voltage determination circuit of the power reception device preferably determines that the non-contact power supply device is performing the constant voltage output operation.

By having such a configuration, the non-contact power supply device is capable of accurately determining whether or not the non-contact power supply device is performing the constant voltage output operation when no foreign object has intruded between the transmission coil and the reception coil.

Alternatively, in the non-contact power supply device, the power transmission device preferably further includes a current detection circuit that measures current flowing through the transmission coil and obtains a measured value of the current, and the control circuit of the power transmission device preferably monitors measured values of the current while changing the switching frequency over the predetermined frequency range and thereby determines whether or not a switching frequency at which measured values of the current have a local maximum is detected and stops power supply from the power supply circuit to the transmission coil when no switching frequency at which measured values of the current have a local maximum is detected.

By having such a configuration, the non-contact power supply device is capable of securely preventing a malfunction due to a foreign object that has intruded between the transmission coil and the reception coil from occurring.

According to another embodiment of the present invention, a method for abnormal stop in a non-contact power supply device including a power transmission device and a power reception device to which power is transmitted from the power transmission device without contact is provided. In the method for abnormal stop, the power reception device of the non-contact power supply device includes a resonance circuit that includes a reception coil that receives power from the power transmission device, a rectification circuit that rectifies power output from the resonance circuit, and a coil that is connected between the resonance circuit and the rectification circuit in series with the reception coil, and the power transmission device includes a transmission coil that supplies power to the power reception device and a power supply circuit that supplies AC power having an adjustable switching frequency to the transmission coil. The method for abnormal stop includes a step of changing switching frequency of the AC power supplied from the power supply circuit to the transmission coil over a predetermined frequency range and a step of stopping power supply from the power supply circuit to the transmission coil when the non-contact power supply device is not performing a constant voltage output operation even when switching frequency of the AC power is changed over the predetermined frequency range.

By having such a configuration, the method for abnormal stop is capable of preventing a malfunction due to a foreign object that has intruded between the transmission coil and the reception coil from occurring even when the coupling coefficient between the transmission coil of the device on the power transmission side and the reception coil of the device on the power reception side changes.

BRIEF DESCRIPTION OF DRAWINGS

FIG. 15 is a diagram illustrating an example of a relationship between frequency responses of the output voltage and frequency responses of input impedance of the non-contact power supply device according to the embodiment illustrated in FIG. 5.

DESCRIPTION OF EMBODIMENTS

A non-contact power supply device according to an embodiment of the present invention will be described below with reference to the drawings. The non-contact power supply device includes a coil that is connected in series with a reception coil of a resonance circuit on the power reception side as with the SPL method. However, differing from the SPL method, the non-contact power supply device can perform a constant voltage output operation even when a coupling coefficient between a transmission coil on the power transmission side and the reception coil changes by supplying the transmission coil with AC power having a frequency at which the transmission coil does not resonate and, in conjunction therewith, adjusting the frequency. In addition, when the constant voltage output operation is not achieved even when the frequency of the AC power supplied to the transmission coil is adjusted, the non-contact power supply device determines that a foreign object made of metal has intruded between the transmission coil and the reception coil and stops power transmission.

First, to facilitate understanding of the non-contact power supply device according to the present invention, a relationship between a constant voltage output operation performed by a non-contact power supply device according to the SPL method and intrusion of a foreign object will be described.

Figure 1:
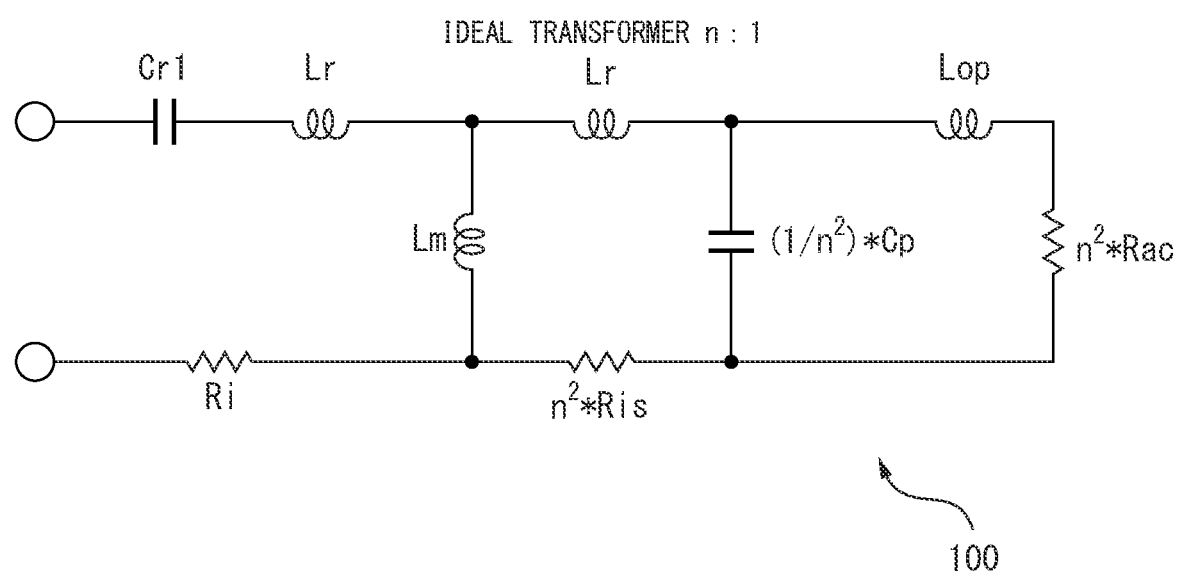
FIG. 1 is an equivalent circuit diagram of a non-contact power supply device according to an SPL method.

FIG. 1 is an equivalent circuit diagram of the non-contact power supply device according to the SPL method. It is assumed that, in an equivalent circuit 100 in the diagram, a transmission coil of a resonance circuit on the power transmission side couples with a reception coil of a resonance circuit on the power reception side to form an ideal transformer with a ratio of n:1. Cr1 is capacitance of a capacitor connected in series with the transmission coil in the resonance circuit on the power transmission side. Lr and Lm are leakage inductance and excitation inductance, respectively, of the resonance circuit on the power transmission side. Note that inductance Lp of the transmission coil of the resonance circuit on the power transmission side is equal to (Lm+Lr) and, when it is assumed that a coupling coefficient between the transmission coil and the reception coil is denoted by k, Lr=(1−k)Lp and Lm=kLp hold. In addition, Ri and Ris are a winding resistance on the power transmission side and a winding resistance on the power reception side, respectively. Cp is capacitance of a capacitor connected in parallel with the reception coil in the resonance circuit on the power reception side. Lop is inductance of a coil connected in series with the reception coil. Rac is an AC equivalent resistance of a load circuit and is expressed, using a resistance Ro of the load circuit, as Rac=(8/π²)×Ro.

From the equivalent circuit 100, an F-matrix Fspl(s, k, Rac) of the non-contact power supply device according to the SPL method is expressed by the following equation.

$$Fspl(s, k, Rac) = \begin{bmatrix} 1 & Rj \\ 0 & 1 \end{bmatrix} \cdot \begin{bmatrix} 1 & \frac{1}{s \cdot Crf} \\ 0 & 1 \end{bmatrix} \cdot \qquad (1)$$

$$\begin{bmatrix} 1 & s \cdot Lr(k) \\ 0 & 1 \end{bmatrix} \cdot \begin{bmatrix} 1 & 0 \\ \frac{1}{s \cdot Lm(k)} & 1 \end{bmatrix} \cdot \begin{bmatrix} 1 & s \cdot Lr(k) \\ 0 & 1 \end{bmatrix} \cdot \begin{bmatrix} 1 & n^2 \cdot Ris \\ 0 & 1 \end{bmatrix}.$$

$$\begin{bmatrix} 1 & 0 \\ s \cdot \frac{1}{n^2} \cdot Cp & 1 \end{bmatrix} \cdot \begin{bmatrix} 1 & s \cdot Lop \cdot n^2 \\ 0 & 1 \end{bmatrix} \cdot \begin{bmatrix} 1 & 0 \\ \frac{1}{n^2 \cdot Rac} & 1 \end{bmatrix}$$

In the above equation, s is expressed as s=j2πf. Note that f is the frequency of AC power that is supplied to the resonance circuit on the power transmission side. In addition, k denotes a coupling coefficient between the transmission coil and the reception coil.

From the definition of the F-matrix, output gain Gspl(s, k, Rac) of the non-contact power supply device according to the SPL method is expressed by the following equation.

$$Gspl(s, k, Rac) = \frac{1}{Fspl(s, k, Rac)_{0,0}} \cdot \frac{Vin}{2} \cdot \frac{1}{n} \qquad (2)$$

In the above equation, Vin is the voltage (amplitude) of the AC power supplied to the resonance circuit on the power transmission side, and Fspl(s, k, Rac)$_{0,0}$ represents the upper left element of the F-matrix expressed by the equation (1).

Figure 2:
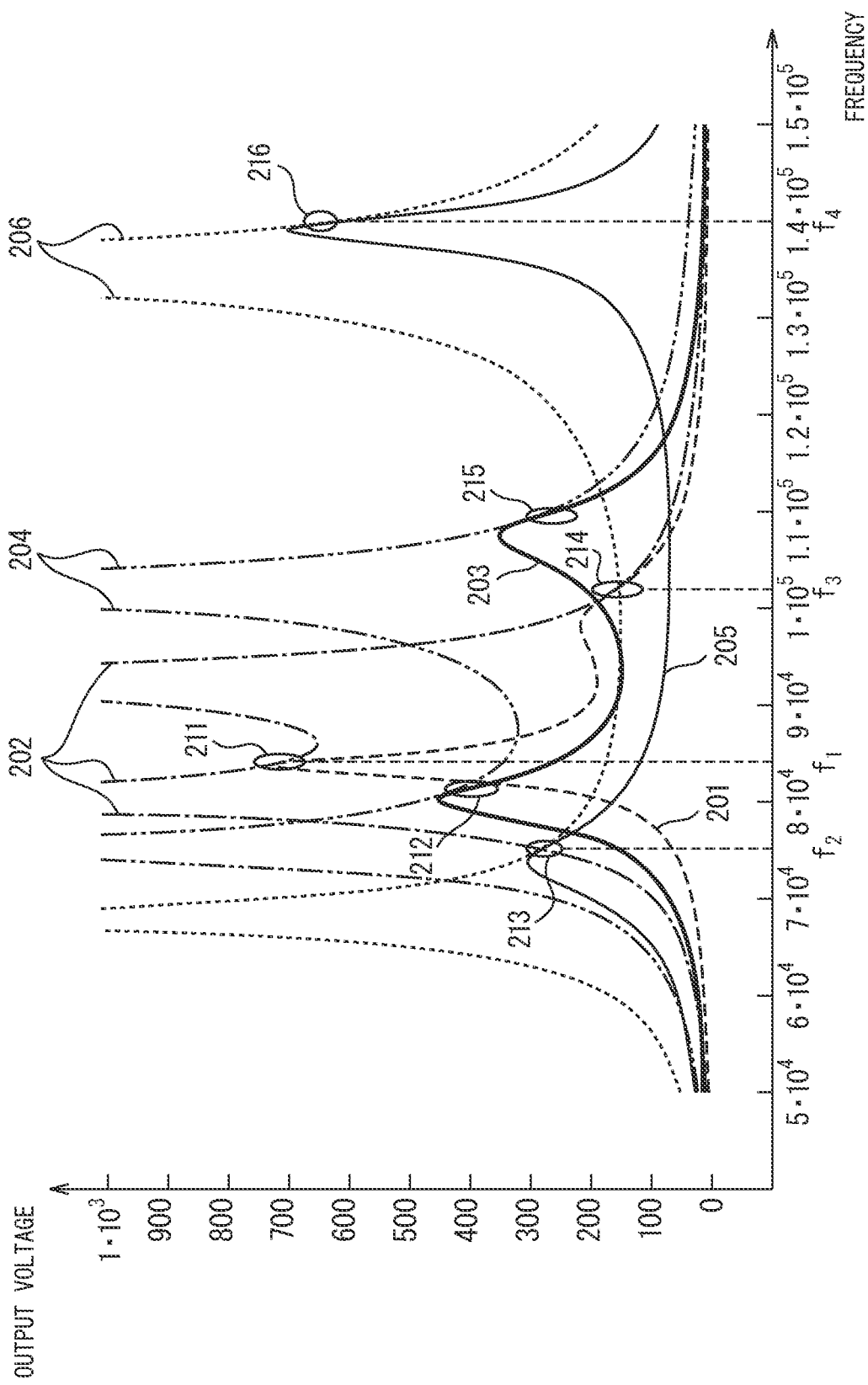
FIG. 2 is a diagram illustrating an example of simulation results of frequency responses of output voltage from the non-contact power supply device according to the SPL method.

FIG. 2 is a diagram illustrating an example of simulation results of frequency responses of output voltage from the non-contact power supply device according to the SPL method, which are calculated in accordance with the equation (2). In FIG. 2, frequency is plotted along the horizontal axis and output voltage is plotted along the vertical axis. Graph 201 represents a frequency response of the output voltage when the coupling coefficient k is set as k=0.15 and the AC equivalent resistance of the load circuit is set at Rac. In addition, graph 202 represents a frequency response of the output voltage when the coupling coefficient k is set as k=0.15 and the AC equivalent resistance of the load circuit is set at (10*Rac). Also, graph 203 represents a frequency response of the output voltage when the coupling coefficient k is set as k=0.3 and the AC equivalent resistance of the load circuit is set at Rac. In addition, graph 204 represents a frequency response of the output voltage when the coupling coefficient k is set as k=0.3 and the AC equivalent resistance of the load circuit is set at (10*Rac). Further, graph 205 represents a frequency response of the output voltage when the coupling coefficient k is set as k=0.6 and the AC equivalent resistance of the load circuit is set at Rac. Moreover, graph 206 represents a frequency response of the output voltage when the coupling coefficient k is set as k=0.6 and the AC equivalent resistance of the load circuit is set at (10*Rac). Note that, in the example, it is assumed that Lp=174 µH, Cr1=Cp=20 nF, Lop=3Lp, Ri=Ris=0.04Ω, n=1, Vin=200 V, and Ro=200Ω (Rac≅162.1Ω).

As illustrated by points 211 to 216 in FIG. 2, there exist six combinations of a frequency and an output voltage at which the output voltage becomes substantially constant even when the AC equivalent resistance of the load circuit changes under the condition where the coupling coefficient k is constant (i.e., constant voltage output is obtained when the coupling coefficient k is constant). Among the points 211 to 216, the points 211 to 213 on the low frequency side are close to the resonance frequency of the resonance circuit on the power transmission side and are influenced by the resonance of the resonance circuit on the power transmission side. On the other hand, the points 214 to 216 on the high frequency side are a certain amount higher than the resonance frequency of the resonance circuit on the power transmission side and are little influenced by the resonance of the resonance circuit on the power transmission side. Note that, since, in the SPL method, in general, the resonance circuit on the power transmission side is also resonated, AC power having frequencies as illustrated by the points 211 to 213 is necessarily supplied to the resonance circuit on the power transmission side in order to make the non-contact power supply device perform a constant voltage output operation.

It is now assumed that a foreign object made of metal has intruded between the transmission coil and the reception coil. Such intrusion of a foreign object influences the leakage inductance Lr, the winding resistance Ri on the power transmission side, and the winding resistance Ris on the power reception side. For example, it is assumed that, because of the intrusion of a foreign object, the leakage inductance Lr decreases by 50 µH and the winding resistance Ri on the power transmission side and the winding resistance Ris on the power reception side respectively increase by 3Ω. In this case, an F-matrix Fp5(s, k, Rac) of the non-contact power supply device according to the SPL method at the time of intrusion of a foreign object is expressed by the following equation.

$$FpS(s, k, Rac) = \begin{bmatrix} 1 & Ri+3 \\ 0 & 1 \end{bmatrix} \cdot \begin{bmatrix} 1 & \frac{1}{s \cdot Crl} \\ 0 & 1 \end{bmatrix} \cdot \qquad (3)$$

$$\begin{bmatrix} 1 & s \cdot (Lr(k) - 0.00005) \\ 0 & 1 \end{bmatrix} \cdot \begin{bmatrix} 1 & 0 \\ \frac{1}{s \cdot Lm(k)} & 1 \end{bmatrix}.$$

-continued $$\begin{bmatrix} 1 & s \cdot (Lr(k) - 0.00005) \\ 0 & 1 \end{bmatrix} \cdot \begin{bmatrix} 1 & n^2 \cdot (Ris + 3) \\ 0 & 1 \end{bmatrix} \cdot$$

$$\begin{bmatrix} 1 & 0 \\ s \cdot \frac{1}{n^2} \cdot Cg & 1 \end{bmatrix} \cdot \begin{bmatrix} 1 & s \cdot Lop \cdot n^2 \\ 0 & 1 \end{bmatrix} \cdot \begin{bmatrix} 1 & 0 \\ \frac{1}{n^2 \cdot Rac} & 1 \end{bmatrix}$$

Therefore, output gain Gp5(s, k, Rac) at the time of intrusion of a foreign object is expressed by the following equation.

$$Gp5(s, k, Rac) = \frac{1}{Fp5(s, k, Rac)} \cdot \frac{Vin}{2} \cdot \frac{1}{n} \quad (4)$$

In the above equation, $Fp5(s, k, Rac)_{0,0}$ represents the upper left element of the F-matrix expressed by the equation (3).

Figure 3:
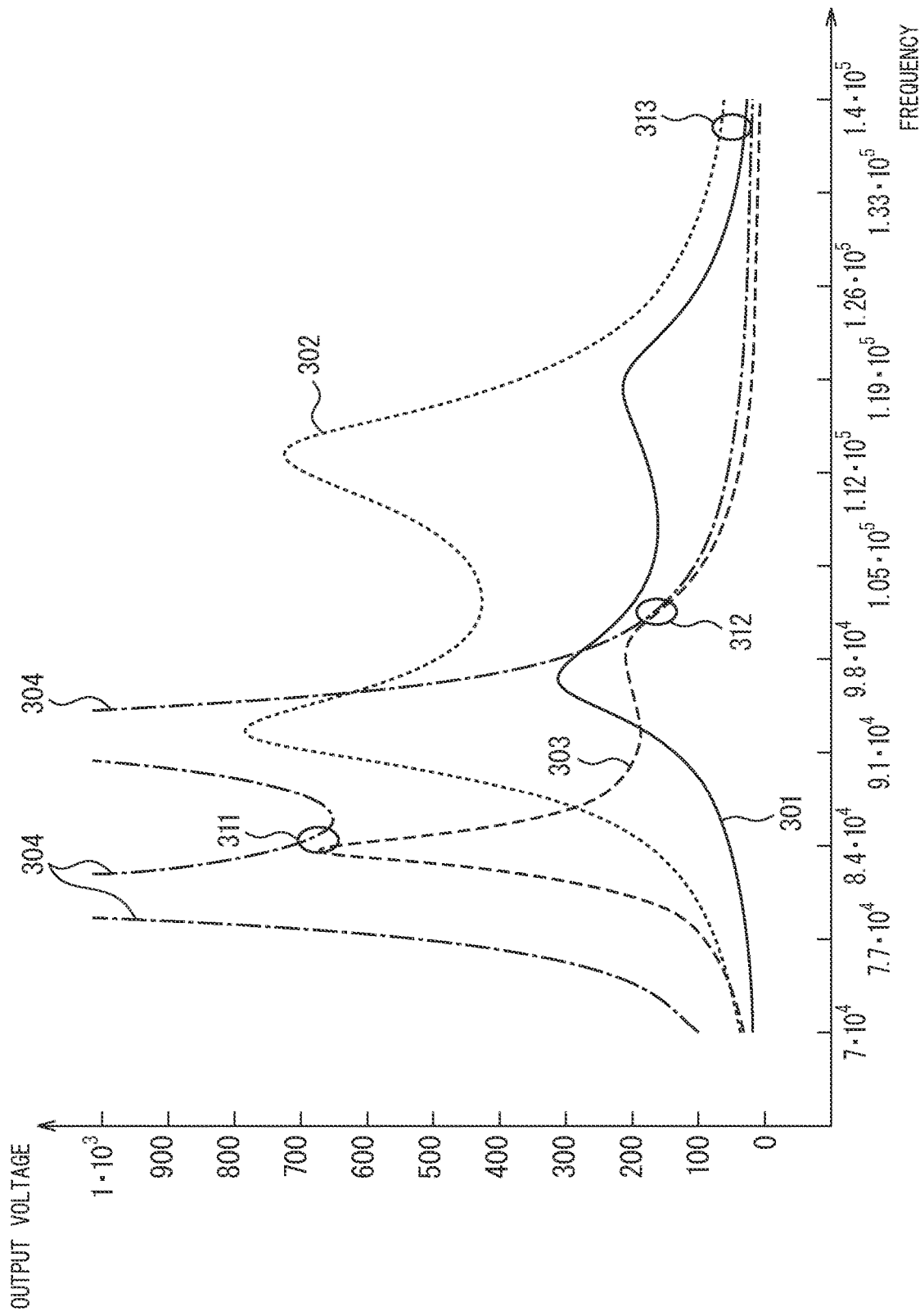
FIG. 3 is a diagram illustrating an example of simulation results of frequency responses of the output voltage from the non-contact power supply device according to the SPL method at the time of intrusion of a foreign object.

FIG. 3 is a diagram illustrating an example of simulation results of frequency responses of output voltage from the non-contact power supply device according to the SPL method at the time of intrusion of a foreign object, which are calculated in accordance with the equation (4). In FIG. 3, frequency is plotted along the horizontal axis and output voltage is plotted along the vertical axis. Graph 301 represents a frequency response of the output voltage when the coupling coefficient k is set as k=0.15 and the AC equivalent resistance of the load circuit is set at Rac. In addition, graph 302 represents a frequency response of the output voltage when the coupling coefficient k is set as k=0.15 and the AC equivalent resistance of the load circuit is set at (10*Rac). In addition, graph 303 represents, as a comparative example, a frequency response of the output voltage when no foreign object has intruded (i.e., the frequency response is calculated in accordance with the equation (2)), the coupling coefficient k is set as k=0.15, and the AC equivalent resistance of the load circuit is set at Rac. Further, graph 304 represents, as another comparative example, a frequency response of the output voltage when no foreign object has intruded, the coupling coefficient k is set as k=0.15, and the AC equivalent resistance of the load circuit is set at (10*Rac). Note that, in this example, as parameters of the respective circuit elements, the same values as those of the parameters in the simulation in FIG. 2 were used.

As illustrated by points 311 and 312 in FIG. 3, when no foreign object has intruded, there exist frequencies at which the output voltage becomes substantially constant even when the resistance of the load circuit changes. In contrast, when a foreign object has intruded, there exists no frequency at which the output voltage becomes substantially constant, without depending on change in the resistance of the load circuit. In addition, as illustrated by a point 313, a frequency at which a difference in the output voltage when the resistance of the load circuit changes has the minimum value is different from frequencies at which the output voltage becomes substantially constant when no foreign object has intruded, indicated by the points 311 and 312.

Figure 4A:
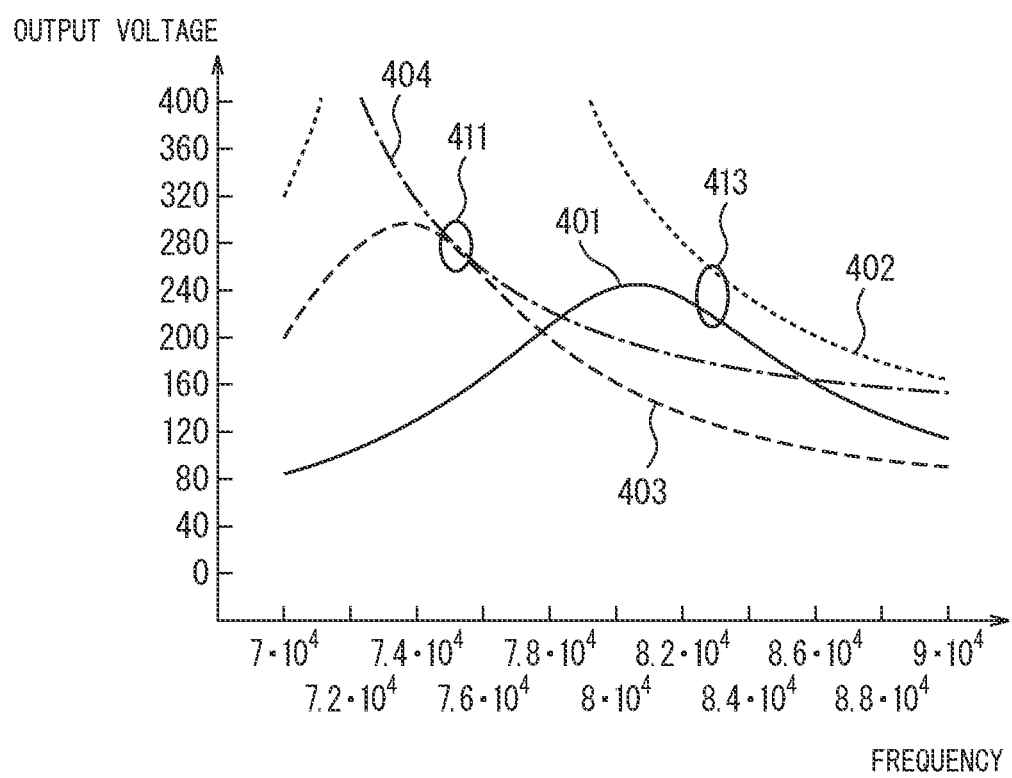
FIG. 4A is a diagram illustrating another example of simulation results of frequency responses of the output voltage from the non-contact power supply device according to the SPL method at the time of intrusion of a foreign object.
Figure 4B:
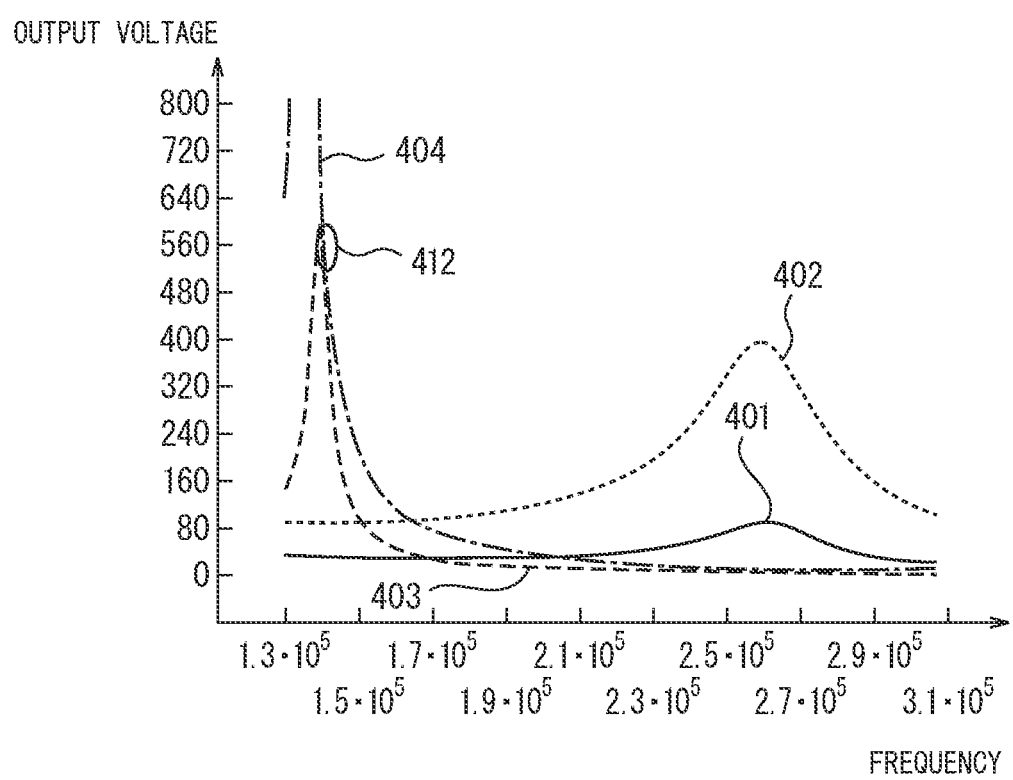
FIG. 4B is another diagram illustrating the other example of the simulation results of frequency responses of the output voltage from the non-contact power supply device according to the SPL method at the time of intrusion of a foreign object.

FIGS. 4A and 4B are diagrams illustrating another example of simulation results of frequency responses of the output voltage from the non-contact power supply device according to the SPL method at the time of intrusion of a foreign object, which are calculated in accordance with the equation (4). In FIGS. 4A and 4B, frequency is plotted along the horizontal axis and output voltage is plotted along the vertical axis. Note that FIG. 4A illustrates frequency responses of the output voltage in a frequency band in which the resonance circuit on the power transmission side resonates, and FIG. 4B illustrates frequency responses of the output voltage in a frequency band that is higher than the frequency band in which the resonance circuit on the power transmission side resonates. Graph 401 represents a frequency response of the output voltage when the coupling coefficient k is set as k=0.6 and the AC equivalent resistance of the load circuit is set at Rac. In addition, graph 402 represents a frequency response of the output voltage when the coupling coefficient k is set as k=0.6 and the AC equivalent resistance of the load circuit is set at (10*Rac). In addition, graph 403 represents, as a comparative example, a frequency response of the output voltage when no foreign object has intruded (i.e., the frequency response is calculated in accordance with the equation (2)), the coupling coefficient k is set as k=0.6, and the AC equivalent resistance of the load circuit is set at Rac. Further, graph 404 represents, as another comparative example, a frequency response of the output voltage when no foreign object has intruded, the coupling coefficient k is set as k=0.6, and the AC equivalent resistance of the load circuit is set at (10*Rac). Note that, in this example, as parameters of the respective circuit elements, the same values as those of the parameters in the simulation in FIG. 2 were used.

As illustrated by points 411 and 412 in FIGS. 4A and 4B, when no foreign object has intruded, there exist frequencies at which the output voltage becomes substantially constant even when the resistance of the load circuit changes. In contrast, when a foreign object has intruded, there exists no frequency at which the output voltage becomes substantially constant, without depending on change in the resistance of the load circuit. In addition, as illustrated by a point 413, a frequency at which a difference in the output voltage when the resistance of the load circuit changes has the minimum value is different from frequencies at which the output voltage becomes substantially constant when no foreign object has intruded, indicated by the points 411 and 412.

As illustrated in FIGS. 3, 4A, and 4B, when no foreign object has intruded between the transmission coil and the reception coil and the coupling coefficient between the transmission coil and the reception coil changes, adjustment of the frequency of the AC power supplied to the transmission coil enables the non-contact power supply device to continue a constant voltage output operation. In contrast, when a foreign object has intruded between the transmission coil and the reception coil, the non-contact power supply device is unable to perform a constant voltage output operation even when the frequency of the AC power supplied to the transmission coil is adjusted.

Thus, a non-contact power supply device according to an embodiment of the present invention adjusts, when unable to continue a constant voltage output operation, frequency of AC power supplied to a transmission coil and thereby searches for a frequency at which the non-contact power supply device performs the constant voltage output operation. When no frequency at which the non-contact power supply device performs the constant voltage output operation is found, the non-contact power supply device determines that a foreign object has intruded between the transmission coil and a reception coil and stops power transmission. On the other hand, when a frequency at which the non-contact power supply device performs the constant voltage output operation is found, the non-contact power supply device determines that the coupling coefficient between the transmission coil and the reception coil has changed and continues power transmission at the frequency at which the non-contact power supply device performs the constant voltage output operation. This configuration enables the non-contact power supply device to detect a foreign object that has intruded between the transmission coil and the reception coil even when the coupling coefficient between the transmission coil and the reception coil changes.

Note that, as used herein, the constant voltage output operation is an operation in which the non-contact power supply device operates in such a way that output voltage is maintained within an allowance range of voltage (for example, within ±10% of a predetermined voltage reference value) that is determined in accordance with the specification of a load circuit connected to the non-contact power supply device and the like.

Figure 5:
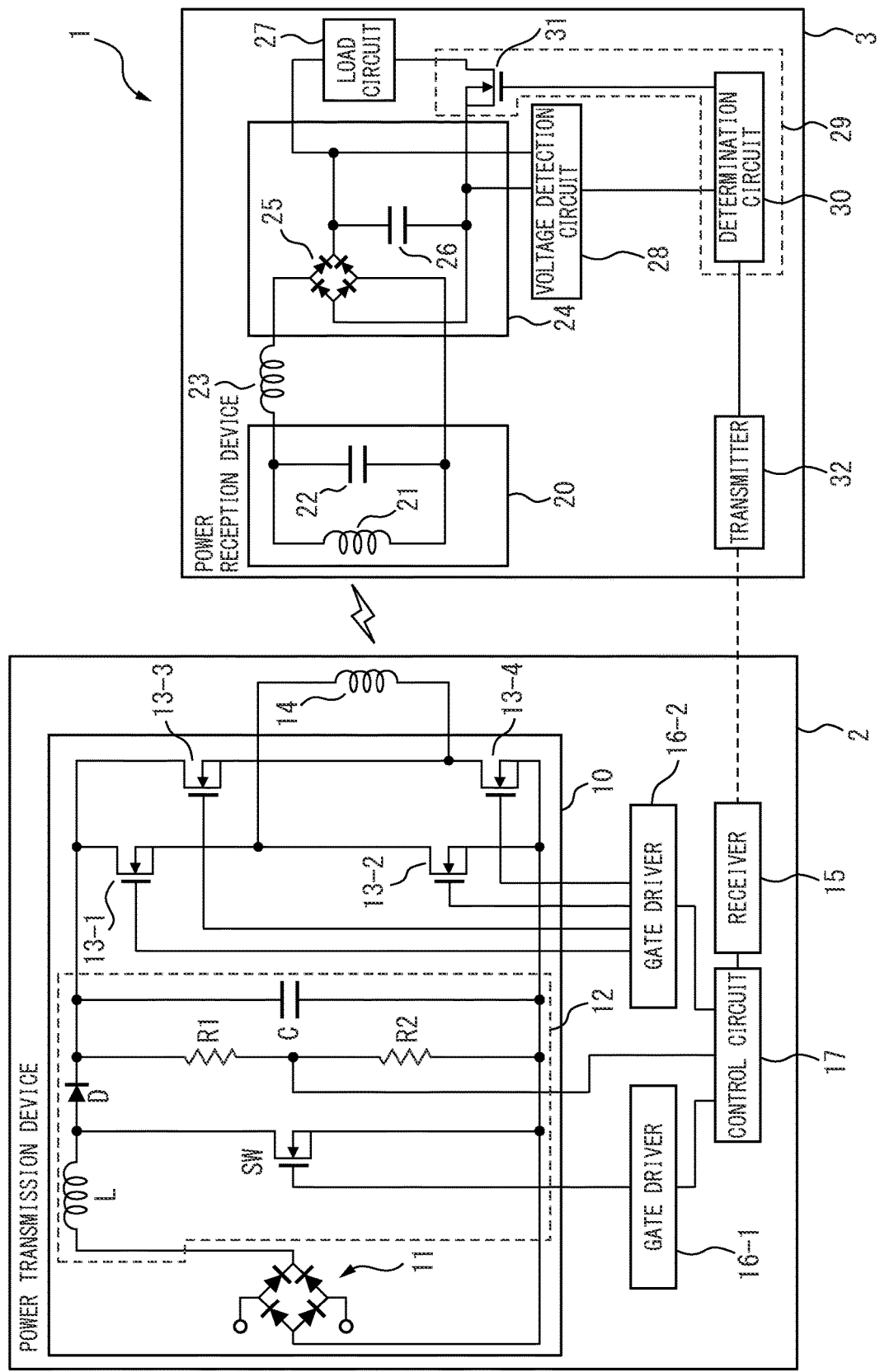
FIG. 5 is a schematic configuration view of a non-contact power supply device according to an embodiment of the present invention.

FIG. 5 is a schematic configuration view of the non-contact power supply device according to the embodiment of the present invention. As illustrated in FIG. 5, a non-contact power supply device 1 includes a power transmission device 2 and a power reception device 3 to which power is transmitted from the power transmission device 2 through space without contact. The power transmission device 2 includes a power supply circuit 10, a transmission coil 14, a receiver 15, gate drivers 16-1 and 16-2, and a control circuit 17. On the other hand, the power reception device 3 includes a resonance circuit 20 that includes a reception coil 21 and a resonance capacitor 22, a coil 23, a rectification and smoothing circuit 24, a load circuit 27, a voltage detection circuit 28, a constant voltage determination circuit 29, and a transmitter 32.

First, the power transmission device 2 will be described.

The power supply circuit 10 supplies the transmission coil 14 with AC power having adjustable switching frequency and adjustable voltage. To that end, the power supply circuit 10 includes a power source 11, a power factor improvement circuit 12, and four switching elements 13-1 to 13-4.

The power source 11 supplies power having a predetermined pulsating voltage. To that end, the power source 11 is connected to a commercial AC power source and includes a full-wave rectification circuit to rectify AC power supplied by the AC power source.

The power factor improvement circuit 12 converts the voltage of the power output from the power source 11 to a voltage that is determined in accordance with control from the control circuit 17 to output the converted voltage. To that end, the power factor improvement circuit 12 includes, for example, a coil L and a diode D that are connected in series in this order from the positive electrode terminal of the power source 11, a switching element SW whose drain terminal and source terminal are connected between the coil L and the diode D and connected to the negative electrode terminal of the power source 11, respectively, and that is an n-channel MOSFET, and a smoothing capacitor C that is connected in parallel with the switching element SW with the diode D interposed therebetween. In addition, the gate terminal of the switching element SW is connected to the gate driver 16-1. Further, the power factor improvement circuit 12 includes two resistors R1 and R2 that are connected in series between the positive electrode terminal and the negative electrode terminal of the power source 11. The resistors R1 and R2 are connected between the diode D and the smoothing capacitor C in parallel with the smoothing capacitor C. Voltage between the resistor R1 and the resistor R2 is measured by the control circuit 17 as a measurement representing voltage output from the diode D.

The power factor improvement circuit 12 performs a power factor improvement operation by the gate driver 16-1 controlling switching of the switching element SW between on and off states in accordance with a duty ratio designated by the control circuit 17 and in such a way that a trajectory of a current waveform output from the diode D coincides with a trajectory of voltage supplied from the power source 11. The higher the duty ratio at which the switching element SW is turned on, the higher the voltage output from the diode D becomes.

The voltage output from the diode D is smoothed by the smoothing capacitor C and supplied to the transmission coil 14 via the four switching elements 13-1 to 13-4.

Note that the power factor improvement circuit 12 is not limited to the above-described configuration and may have another configuration capable of adjusting output voltage, controlled by the control circuit 17.

For the four switching elements 13-1 to 13-4, for example, n-channel MOSFETs can be used. Among the four switching elements 13-1 to 13-4, the switching element 13-1 and the switching element 13-2 are connected in series between the positive electrode terminal and negative electrode terminal of the power source 11 via the power factor improvement circuit 12. In addition, in the present embodiment, the switching element 13-1 is connected to the positive electrode side of the power source 11, whereas the switching element 13-2 is connected to the negative electrode side of the power source 11. The drain terminal of the switching element 13-1 is connected to the positive electrode terminal of the power source 11 via the power factor improvement circuit 12, and the source terminal of the switching element 13-1 is connected to the drain terminal of the switching element 13-2. In addition, the source terminal of the switching element 13-2 is connected to the negative electrode terminal of the power source 11 via the power factor improvement circuit 12. Further, the source terminal of the switching element 13-1 and the drain terminal of the switching element 13-2 are connected to one end of the transmission coil 14, and the source terminal of the switching element 13-2 is connected to the other end of the transmission coil 14 via the switching element 13-4.

Similarly, among the four switching elements 13-1 to 13-4, the switching element 13-3 and the switching element 13-4 are connected in parallel with the switching element 13-1 and the switching element 13-2 and in series between the positive electrode terminal and negative electrode terminal of the power source 11 via the power factor improvement circuit 12. In addition, the switching element 13-3 is connected to the positive electrode side of the power source 11, whereas the switching element 13-4 is connected to the negative electrode side of the power source 11. The drain terminal of the switching element 13-3 is connected to the positive electrode terminal of the power source 11 via the power factor improvement circuit 12, and the source terminal of the switching element 13-3 is connected to the drain terminal of the switching element 13-4. In addition, the source terminal of the switching element 13-4 is connected to the negative electrode terminal of the power source 11 via the power factor improvement circuit 12. Further, the source terminal of the switching element 13-3 and the drain terminal of the switching element 13-4 are connected to the other end of the transmission coil 14.

In addition, the gate terminals of the switching elements 13-1 to 13-4 are connected to the control circuit 17 via the gate driver 16-2. Further, each of the switching elements 13-1 to 13-4 may have its gate terminal connected to its own source terminal via a resistor to ensure that the switching element is turned on when a voltage to turn on the switching element is applied. The switching elements 13-1 to 13-4 are switched between on and off states at an adjustable switching frequency in accordance with a control signal from the control circuit 17. In the present embodiment, a pair of the switching element 13-1 and the switching element 13-4 and a pair of the switching element 13-2 and the switching element 13-3 are alternately switched between on and off states in such a way as to turn off the switching element 13-2 and the switching element 13-3 while the switching element 13-1 and the switching element 13-4 are turned on and, conversely, to turn off the switching element 13-1 and the switching element 13-4 while the switching element 13-2 and the switching element 13-3 are turned on. This configuration causes DC power supplied from the power source 11 via the power factor improvement circuit 12 to be converted into AC power having the switching frequency of the switching elements and supplied to the transmission coil 14.

The transmission coil 14 transmits the AC power supplied from the power supply circuit 10 to the resonance circuit 20 of the power reception device 3 through space.

The receiver 15 takes out, every time receiving a wireless signal from the transmitter 32 of the power reception device 3, determination information indicating whether or not the non-contact power supply device 1 is performing a constant voltage output operation and the like from the wireless signal and outputs the determination information to the control circuit 17. To that end, the receiver 15 includes, for example, an antenna for receiving a wireless signal and a communication circuit for demodulating the wireless signal in accordance with a predetermined wireless communication standard. Note that the predetermined wireless communication standard may be, for example, ISO/IEC 15693, ZigBee (registered trademark), or Bluetooth (registered trademark).

The gate driver 16-1 receives a control signal for switching the switching element SW of the power factor improvement circuit 12 between on and off states from the control circuit 17 and, in accordance with the control signal, changes voltage applied to the gate terminal of the switching elements SW. In other words, upon receiving a control signal to turn on the switching element SW, the gate driver 16-1 applies to the gate terminal of the switching element SW such a relatively high voltage as to turn on the switching element SW. On the other hand, upon receiving a control signal to turn off the switching element SW, the gate driver 16-1 applies to the gate terminal of the switching element SW such a relatively low voltage as to turn off the switching element SW. This configuration causes the gate driver 16-1 to switch the switching element SW of the power factor improvement circuit 12 between on and off states at timings designated by the control circuit 17.

The gate driver 16-2 receives a control signal for switching the switching elements 13-1 to 13-4 between on and off states from the control circuit 17 and, in accordance with the control signal, changes voltage applied to the gate terminals of the switching elements 13-1 to 13-4. In other words, upon receiving a control signal to turn on the switching element 13-1 and the switching element 13-4, the gate driver 16-2 applies to the gate terminal of the switching element 13-1 and the gate terminal of the switching element 13-4 such a relatively high voltage as to turn on the switching element 13-1 and the switching element 13-4. This operation causes current from the power source 11 to flow through the switching element 13-1, the transmission coil 14, and the switching element 13-4. On the other hand, upon receiving a control signal to turn off the switching element 13-1 and the switching element 13-4, the gate driver 16-2 applies to the gate terminal of the switching element 13-1 and the gate terminal of the switching element 13-4 such a relatively low voltage as to turn off the switching element 13-1 and the switching element 13-4 and as to prevent current from the power source 11 from flowing through the switching element 13-1 and the switching element 13-4. Similarly, the gate driver 16-2 controls voltage applied to the gate terminals of the switching element 13-2 and the switching element 13-3. Thus, when the switching element 13-1 and the switching element 13-4 are turned off and the switching element 13-2 and the switching element 13-3 are turned on, current from the power source 11 comes to flow through the switching element 13-3, the transmission coil 14, and the switching element 13-2.

The control circuit 17 includes, for example, a non-volatile memory circuit and a volatile memory circuit, an arithmetic operation circuit, and an interface circuit for connection to other circuits. Every time the control circuit 17 receives determination information from the receiver 15, the control circuit 17 controls the switching frequency and voltage of the AC power supplied from the power supply circuit 10 to the transmission coil 14 in accordance with the determination information.

To that end, in the present embodiment, the control circuit 17 controls the switching elements 13-1 to 13-4 in such a way that the pair of the switching element 13-1 and the switching element 13-4 and the pair of the switching element 13-2 and the switching element 13-3 are alternately turned on and that a duration for which the pair of the switching element 13-1 and the switching element 13-4 are in the on state and a duration for which the pair of the switching element 13-2 and the switching element 13-3 are in the on state are equal to each other in one period corresponding to the switching frequency. Note that, in order to prevent the pair of the switching element 13-1 and the switching element 13-4 and the pair of the switching element 13-2 and the switching element 13-3 from being simultaneously in the on state and the power source 11 from being short-circuited, the control circuit 17 may set a dead time during which both pairs of switching elements are turned off when the pair of the switching element 13-1 and the switching element 13-4 and the pair of the switching element 13-2 and the switching element 13-3 are switched between on and off states.

In addition, the control circuit 17, referring to a reference table each entry of which indicates a relationship between a switching frequency and a duty ratio that corresponds to an applied voltage to the transmission coil 14 that causes a constant voltage to be output at the switching frequency and is used in the on/off control of the switching element SW of the power factor improvement circuit 12, selects a duty ratio corresponding to a desired switching frequency. The control circuit 17 determines timings at which the switching element SW is switched between on and off states, on the basis of the duty ratio and change in the output voltage from the diode D of the power factor improvement circuit 12 and outputs control signals representing the timings to the gate driver 16-1.

Further, when the receiver 15 is unable to receive a wireless signal from the power reception device 3, it is judged that the power reception device 3 is not present at a position enabling the power reception device 3 to receive power supply from the power transmission device 2, i.e., the power transmission device 2 is in a standby state. Thus, in this case, the control circuit 17 may set the duty ratio for the on/off control of the switching element SW at 0 and stop power supply from the power supply circuit 10 to the transmission coil 14. This control enables energy loss to be suppressed while the power transmission device 2 is in the standby state. In addition, as will be described later, when it is determined that a foreign object made of metal has intruded between the transmission coil 14 and the reception coil 21, the control circuit 17 also sets the duty ratio for the on/off control of the switching element SW at 0 and stops power supply from the power supply circuit 10 to the transmission coil 14.

Note that details of the control of the switching frequency and the applied voltage to the transmission coil 14 and the stop processing because of a foreign object, which are performed by the control circuit 17, will be described later.

Next, the power reception device 3 will be described.

The resonance circuit 20 is an LC resonance circuit that is constituted by the reception coil 21 and the resonance capacitor 22 that are connected in parallel with each other. One end of the reception coil 21 included in the resonance circuit 20 is connected to one end of the resonance capacitor 22 and, in conjunction therewith, connected to one input terminal of the rectification and smoothing circuit 24 via the coil 23. In addition, the other end of the reception coil 21 is connected to the other end of the resonance capacitor 22 and, in conjunction therewith, connected to the other input terminal of the rectification and smoothing circuit 24.

The reception coil 21 receives power from the transmission coil 14 by resonating with the AC current flowing through the transmission coil 14 of the power transmission device 2. The reception coil 21 outputs the received power to the rectification and smoothing circuit 24 via the resonance capacitor 22 and the coil 23. Note that the number of turns in the winding of the reception coil 21 and the number of turns in the winding of the transmission coil 14 of the power transmission device 2 may be identical or different.

The resonance capacitor 22 is connected at one end to one end of the reception coil 21 and the coil 23 and at the other end to the other end of the reception coil 21 and the rectification and smoothing circuit 24. The resonance capacitor 22 outputs the power received by the reception coil 21 to the rectification and smoothing circuit 24 via the coil 23.

The coil 23 is connected between the resonance circuit 20 and the rectification and smoothing circuit 24. In the present embodiment, the coil 23 is connected at one end to the reception coil 21 and resonance capacitor 22 of the resonance circuit 20 in such a way as to be in series with the reception coil 21 and at the other end to the rectification and smoothing circuit 24. The coil 23 outputs the power received from the resonance circuit 20 to the rectification and smoothing circuit 24. Note that, as with the SPL method, disposing the coil 23 enables harmonic components of the received power to be suppressed.

The rectification and smoothing circuit 24 is an example of a rectification circuit, includes a full-wave rectification circuit 25 that includes four diodes connected in a bridge circuit and a smoothing capacitor 26, and rectifies and smooths the power which is received via the resonance circuit 20 and the coil 23 to convert the power into DC power. The rectification and smoothing circuit 24 outputs the DC power to the load circuit 27.

The voltage detection circuit 28 detects output voltage between both terminals of the rectification and smoothing circuit 24 every predetermined period. Since the output voltage between both terminals of the rectification and smoothing circuit 24 corresponds one-to-one to the output voltage of the resonance circuit 20, a measured value of the output voltage between both terminals of the rectification and smoothing circuit 24 indirectly represents a measured value of the output voltage of the resonance circuit 20. For the voltage detection circuit 28, for example, any of various known voltage detection circuits that can detect DC voltage can be used. The voltage detection circuit 28 outputs a voltage detection signal representing a measured value of the output voltage to the constant voltage determination circuit 29.

The constant voltage determination circuit 29 determines, on the basis of the measured value of the output voltage received from the voltage detection circuit 28, whether or not the non-contact power supply device 1 is performing a constant voltage output operation and whether or not the measured value of the output voltage falls within an allowance range of voltage when the constant voltage output operation is performed. The constant voltage determination circuit 29 notifies the transmitter 32 of a result of the determination. To that end, the constant voltage determination circuit 29 includes, for example, a memory circuit configured to store an allowance range of voltage and a determination circuit 30 including an arithmetic operation circuit configured to compare a measured value of the output voltage with the allowance range of voltage.

Further, the constant voltage determination circuit 29 includes a switching element 31, such as a MOSFET, that is connected between the rectification and smoothing circuit 24 and the load circuit 27. The switching element 31, when turned off, prevents current from flowing from the rectification and smoothing circuit 24 to the load circuit 27 (i.e., Rac=∞), whereas the switching element 31, when turned on, allows current to flow from the rectification and smoothing circuit 24 to the load circuit 27. The determination circuit 30 of the constant voltage determination circuit 29 switches the switching element 31 between on and off states at a predetermined period while measured values of the output voltage are out of the allowance range of voltage. This operation causes the resistance of the whole circuit including the load circuit 27, which is connected to the rectification and smoothing circuit 24, to change at the predetermined period. Therefore, the determination circuit 30 is able to determine whether or not the non-contact power supply device 1 is performing a constant voltage output operation by determining whether or not the measured values of the output voltage become substantially constant while switching the switching element 31 between on and off states. Thus, while measured values of the output voltage are substantially constant even when the determination circuit 30 switches the switching element 31 between on and off states at a predetermined period, the determination circuit 30 notifies the transmitter 32 that the non-contact power supply device 1 is performing the constant voltage output operation.

In addition, when measured values of the output voltage indicate that the non-contact power supply device 1 is performing the constant voltage output operation for a certain duration longer than the predetermined period, the determination circuit 30 suspends the switching of the switching element 31 between on and off states and maintains the switching element 31 in the on state. The determination circuit 30 determines whether or not the measured value of the output voltage falls within the allowance range of voltage and notifies the transmitter 32 of a result of the determination.

When the measured values of the output voltage fall within the allowance range of voltage for a certain duration longer than the predetermined period, the determination circuit 30 notifies the transmitter 32 of a determination result indicating that the non-contact power supply device 1 is performing the constant voltage output operation and the measured values of the output voltage are within the allowance range of voltage.

Note that, according to a variation, the constant voltage determination circuit 29 may include a resistor that is connected to the rectification and smoothing circuit 24 in parallel with the load circuit 27. In this case, the switching element 31 may be disposed in such a way as to be in series with the resistor and in parallel with the load circuit 27. In this case, the determination circuit 30 turns off the switching element 31 while measured values of the output voltage fall within the allowance range of voltage. On the other hand, when a measured value of the output voltage is out of the allowance range of voltage, the determination circuit 30 may, as with the above-described embodiment, switch the switching element 31 between on and off states at the predetermined period. According to the variation, the power supply to the load circuit 27 is maintained even when the non-contact power supply device 1 does not perform constant voltage output operation.

Further, according to another variation, a second switching element, such as a MOSFET, may be disposed in parallel with the above-described resistor and in series with the load circuit 27. In this case, while measured values of the output voltage fall within the allowance range of voltage, the determination circuit 30 turns on the second switching element and thereby enables power supply to the load circuit 27. On the other hand, when a measured value of the output voltage is out of the allowance range of voltage, the determination circuit 30 may turn off the second switching element and suspend the power supply to the load circuit 27. Even when voltage of received power has increased to an excessively high level while the switching frequency is adjusted in the power transmission device 2, this configuration prevents the excessively high voltage from being applied to the load circuit 27.

The transmitter 32 generates, every predetermined transmission period, generates a wireless signal including determination information indicating whether or not the non-contact power supply device 1 is performing the constant voltage output operation and whether or not measured values of the output voltage fall within the allowance range of voltage, on the basis of a determination result received from the determination circuit 30 of the constant voltage determination circuit 29 and transmits the wireless signal to the receiver 15 of the power transmission device 2. To that end, the transmitter 32 includes, for example, a communication circuit that generates a wireless signal in accordance with a predetermined wireless communication standard and an antenna for outputting the wireless signal. Note that, as with the receiver 15, the predetermined wireless communication standard may be, for example, ISO/IEC 15693, ZigBee (registered trademark), or Bluetooth (registered trademark).

Operation of the non-contact power supply device 1 will be described in detail below.

In the present embodiment, the control circuit 17 of the power transmission device 2 controls the switching frequency and voltage of AC power supplied from the power supply circuit 10 to the transmission coil 14, on the basis of determination information received from the receiver 15, in such a way that the non-contact power supply device 1 continues the constant voltage output operation.

The non-contact power supply device of the present embodiment differs from the non-contact power supply device according to the SPL method in that resonance of the resonance circuit is not used on the power transmission side. Therefore, the frequency response of the output voltage from the non-contact power supply device 1 resembles the frequency response of the output voltage from the non-contact power supply device according to the SPL method when, in the equivalent circuit in FIG. 1, the capacitance Cr1 of the capacitor connected in series with the transmission coil in the resonance circuit on the power transmission side is increased and the resonance frequency of the resonance circuit on the power transmission side is thereby lowered in order to prevent the resonance of the resonance circuit on the power transmission side from influencing the power supply.

Figure 6:
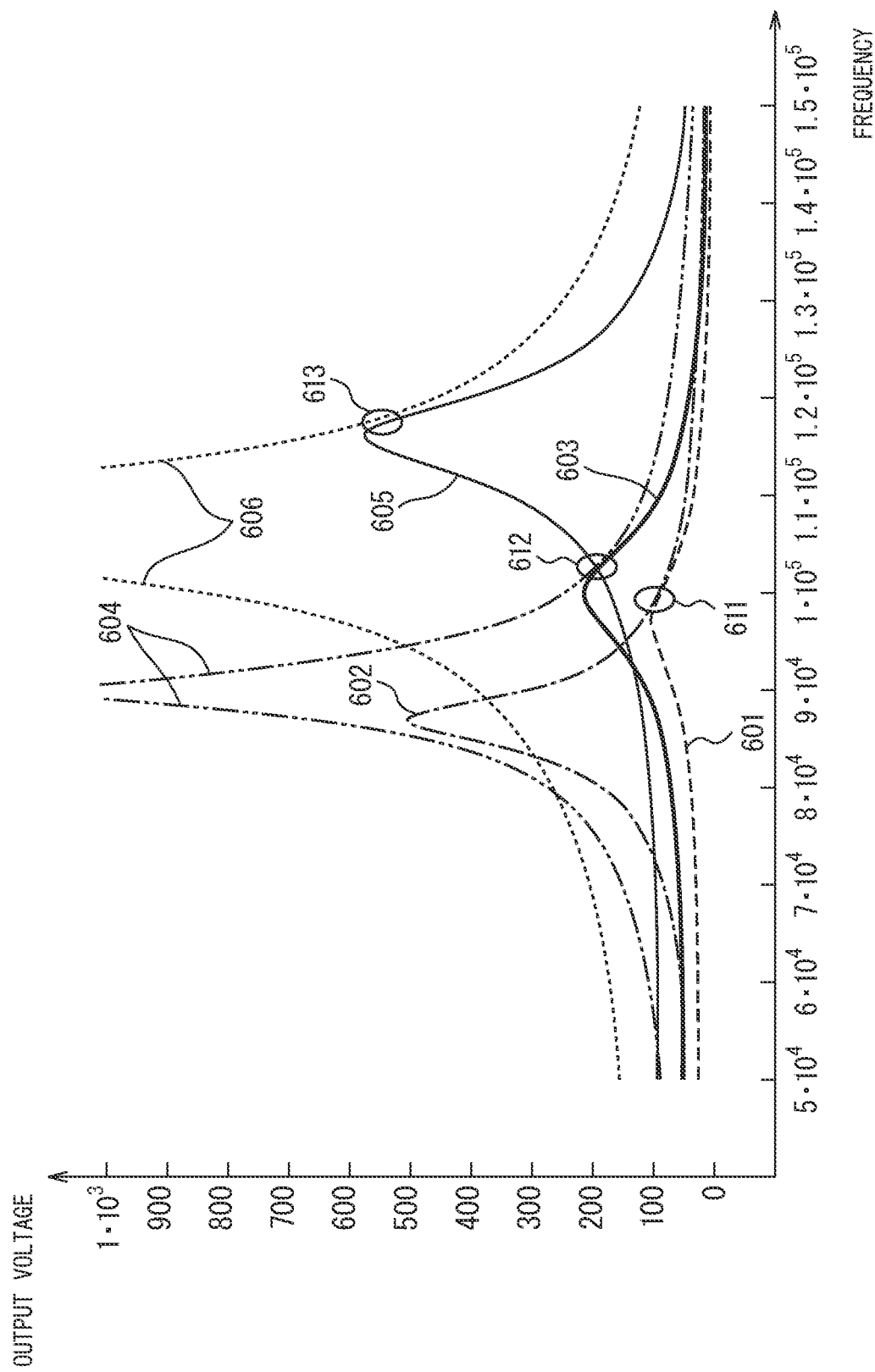
FIG. 6 is a diagram illustrating an example of simulation results of frequency responses of output voltage from the non-contact power supply device according to the present embodiment.

FIG. 6 is a diagram illustrating an example of simulation results of frequency responses of output voltage from the non-contact power supply device 1 according to the present embodiment. In FIG. 6, frequency is plotted along the horizontal axis and output voltage is plotted along the vertical axis. Note that, in the simulation, the same values as the values of parameters of the respective circuit elements used in the simulation illustrated in FIG. 2 were used. Graph 601 represents a frequency response of the output voltage when the coupling coefficient k is set as k=0.15 and the AC equivalent resistance of the load circuit 27 is set at Rac. In addition, graph 602 represents a frequency response of the output voltage when the coupling coefficient k is set as k=0.15 and the AC equivalent resistance of the load circuit 27 is set at (10*Rac). In addition, graph 603 represents a frequency response of the output voltage when the coupling coefficient k is set as k=0.3 and the AC equivalent resistance of the load circuit 27 is set at Rac. In addition, graph 604 represents a frequency response of the output voltage when the coupling coefficient k is set as k=0.3 and the AC equivalent resistance of the load circuit 27 is set at (10*Rac). Further, graph 605 represents a frequency response of the output voltage when the coupling coefficient k is set as k=0.6 and the AC equivalent resistance of the load circuit 27 is set at Rac. Moreover, graph 606 represents a frequency response of the output voltage when the coupling coefficient k is set as k=0.6 and the AC equivalent resistance of the load circuit 27 is set at (10*Rac).

In FIG. 6, since the transmission coil 14 does not resonate, extreme values of the output voltage disappeared on the low frequency side compared with FIG. 2, in the frequency range illustrated in FIG. 6. However, even in this case, there exists, for every coupling coefficient, a combination of a frequency and an output voltage at which the output voltage becomes substantially constant (i.e., a constant voltage is output) even when the AC equivalent resistance of the load circuit 27 changes under the condition that the coupling coefficient k does not change (there exist three combinations illustrated by points 611 to 613 in the Figure). Therefore, it is revealed that, even when AC power having a switching frequency at which the transmission coil 14 does not resonate is applied to the transmission coil 14, it is possible to make the non-contact power supply device 1 perform the constant voltage output operation against change in the resistance of the load circuit 27. Further, although, as illustrated by the points 611 to 613, output voltages when a constant voltage is output against variation in the resistance of the load circuit 27 differ from one another depending on the coupling coefficient, the differences in the output voltages can be reduced to a substantially constant output voltage without depending on the coupling coefficient by adjusting voltage applied to the transmission coil 14.

Figure 7:
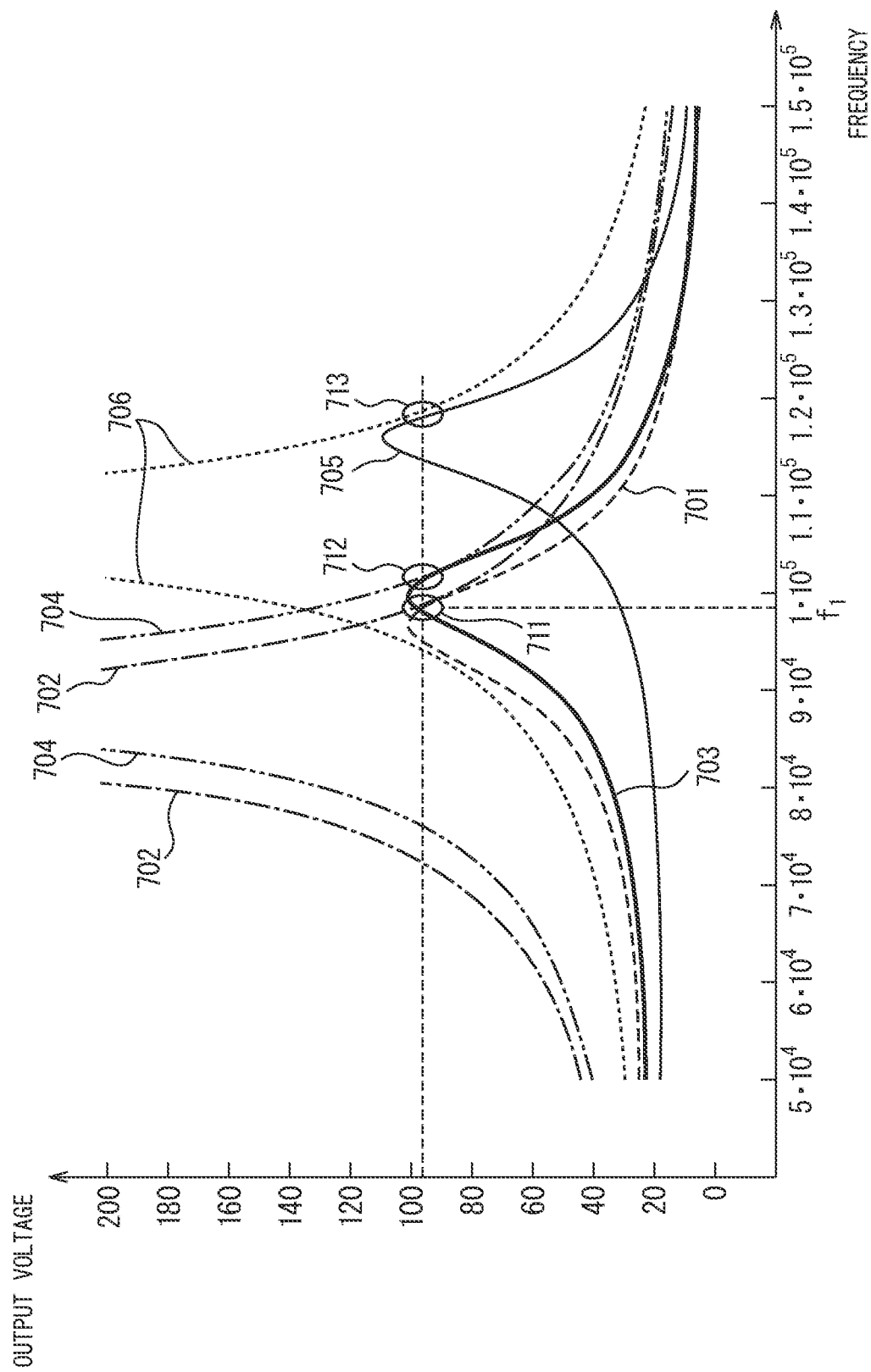
FIG. 7 is a diagram illustrating an example of simulation results of frequency responses of the output voltage when voltage applied to the transmission coil is changed in accordance with a coupling coefficient in the simulation illustrated in FIG. 6.

FIG. 7 is a diagram illustrating an example of simulation results of frequency responses of the output voltage when the voltage applied to the transmission coil 14 is changed in accordance with the coupling coefficient in the simulation illustrated in FIG. 6. In FIG. 7, frequency is plotted along the horizontal axis and output voltage is plotted along the vertical axis. Graph 701 represents a frequency response of the output voltage when the coupling coefficient k is set as k=0.15, the AC equivalent resistance of the load circuit 27 is set at Rac, and the voltage applied to the transmission coil is set at Vin. In addition, graph 702 represents a frequency response of the output voltage when the coupling coefficient k is set as k=0.15, the AC equivalent resistance of the load circuit 27 is set at (10*Rac), and the voltage applied to the transmission coil is set at Vin. In addition, graph 703 represents a frequency response of the output voltage when the coupling coefficient k is set as k=0.3, the AC equivalent resistance of the load circuit 27 is set at Rac, and the voltage applied to the transmission coil is set at (0.47*Vin). In addition, graph 704 represents a frequency response of the output voltage when the coupling coefficient k is set as k=0.3, the AC equivalent resistance of the load circuit 27 is set at (10*Rac), and the voltage applied to the transmission coil is set at (0.47*Vin). Further, graph 705 represents a frequency response of the output voltage when the coupling coefficient k is set as k=0.6, the AC equivalent resistance of the load circuit 27 is set at Rac, and the voltage applied to the transmission coil is set at (0.19*Vin). Moreover, graph 706 represents a frequency response of the output voltage when the coupling coefficient k is set as k=0.6, the AC equivalent resistance of the load circuit 27 is set at (10*Rac), and the voltage applied to the transmission coil is set at (0.19*Vin).

Combinations of a frequency and an output voltage that correspond to the points 611 to 613 illustrated in FIG. 6 and at which the output voltage becomes substantially constant (i.e., a constant voltage is output) even when the AC equivalent resistance of the load circuit 27 changes under the condition that the coupling coefficient k does not change are three combinations indicated by points 711 to 713. The output voltages at the respective points 711 to 713 are substantially equal to one another.

As described above, it is clear that, unless a foreign object has intruded between the transmission coil 14 and the reception coil 21, appropriately adjusting the switching frequency and voltage of the AC power applied to the transmission coil 14 enables the output voltage to be maintained substantially constant even when either the resistance of the load circuit 27 or the coupling coefficient changes.

Consequently, in order to achieve the constant voltage output operation, the control circuit 17 controls the switching frequency and voltage of the AC power applied to the transmission coil 14, as described below.

When determination information included in a wireless signal received from the power reception device 3 via the receiver 15 indicates that the non-contact power supply device 1 is not performing the constant voltage output operation, the control circuit 17 changes the switching frequency of the AC power within a predetermined frequency range. The predetermined frequency range can be set as, for example, a frequency range whose lower limit and upper limit are set to a frequency at which a constant voltage is output at the minimum of the expected values of the coupling coefficient between the transmission coil 14 and the reception coil 21 and a frequency at which a constant voltage is output at the maximum of the expected values of the coupling coefficient between the transmission coil 14 and the reception coil 21, respectively, when power is supplied from the power transmission device 2 to the power reception device 3.

When changing the switching frequency, the control circuit 17 may successively raise the switching frequency from the lower limit to the upper limit of the predetermined frequency range or, conversely, successively lower the switching frequency from the upper limit to the lower limit of the predetermined frequency range. In addition, it is preferable that, in order for the constant voltage determination circuit 29 of the power reception device 3 to be able to check whether or not the output voltage has become substantially constant, the control circuit 17 change the switching frequency in a stepwise manner in such a way as to keep the same switching frequency for a duration longer than the period at which the determination circuit 30 of the constant voltage determination circuit 29 switches the switching element 31 between on and off states.

Note that it is preferable that, while adjusting the switching frequency, the control circuit 17 reduce the voltage applied to the transmission coil 14 to a lower limit voltage. This configuration prevents the voltage of power supplied to the power reception device 3 from excessively increasing.

When the determination information included in the wireless signal received from the power reception device 3 via the receiver 15 does not indicate that the constant voltage output operation is performed even when the switching frequency is changed over the whole of the predetermined frequency range, the control circuit 17 determines that a foreign object has intruded between the transmission coil 14 and the reception coil 21. Then, the control circuit 17 stops power supply from the power supply circuit 10 to the transmission coil 14 and thereby suspends power transmission.

On the other hand, when the determination information included in the wireless signal received from the power reception device 3 via the receiver 15 indicates that measured values of the output voltage, although not falling within the allowance range of voltage, are substantially constant even when the resistance of the load circuit changes, i.e., the constant voltage output operation is performed, the control circuit 17 keeps the switching frequency constant thereafter. Next, the control circuit 17 determines a duty ratio, referring to the reference table each entry of which indicates a relationship between a switching frequency and a duty ratio that causes a constant voltage to be output at the switching frequency without depending on the coupling coefficient and is used in the on/off control of the switching element SW of the power factor improvement circuit 12. The control circuit 17 controls the gate driver 16-1 in such a way as to switch the switching element SW of the power factor improvement circuit 12 between on and off states in accordance with the duty ratio. This operation causes the voltage applied to the transmission coil 14 to be adjusted in such a way that the output voltage from the resonance circuit 20 falls within the allowance range of voltage, i.e., a constant voltage is output without depending on the coupling coefficient. When the determination information included in a wireless signal received from the power reception device 3 via the receiver 15 indicates that measured values of the output voltage fall within the allowance range of voltage, the control circuit 17 keeps constant the switching frequency and voltage of the AC power supplied to the transmission coil 14.

Note that the control circuit 17 may, in place of determining a duty ratio referring to the above-described reference table, change the duty ratio gradually until the determination information included in a wireless signal received from the power reception device 3 via the receiver 15 indicates that measured values of the output voltage fall within the allowance range of voltage.

Figure 8:
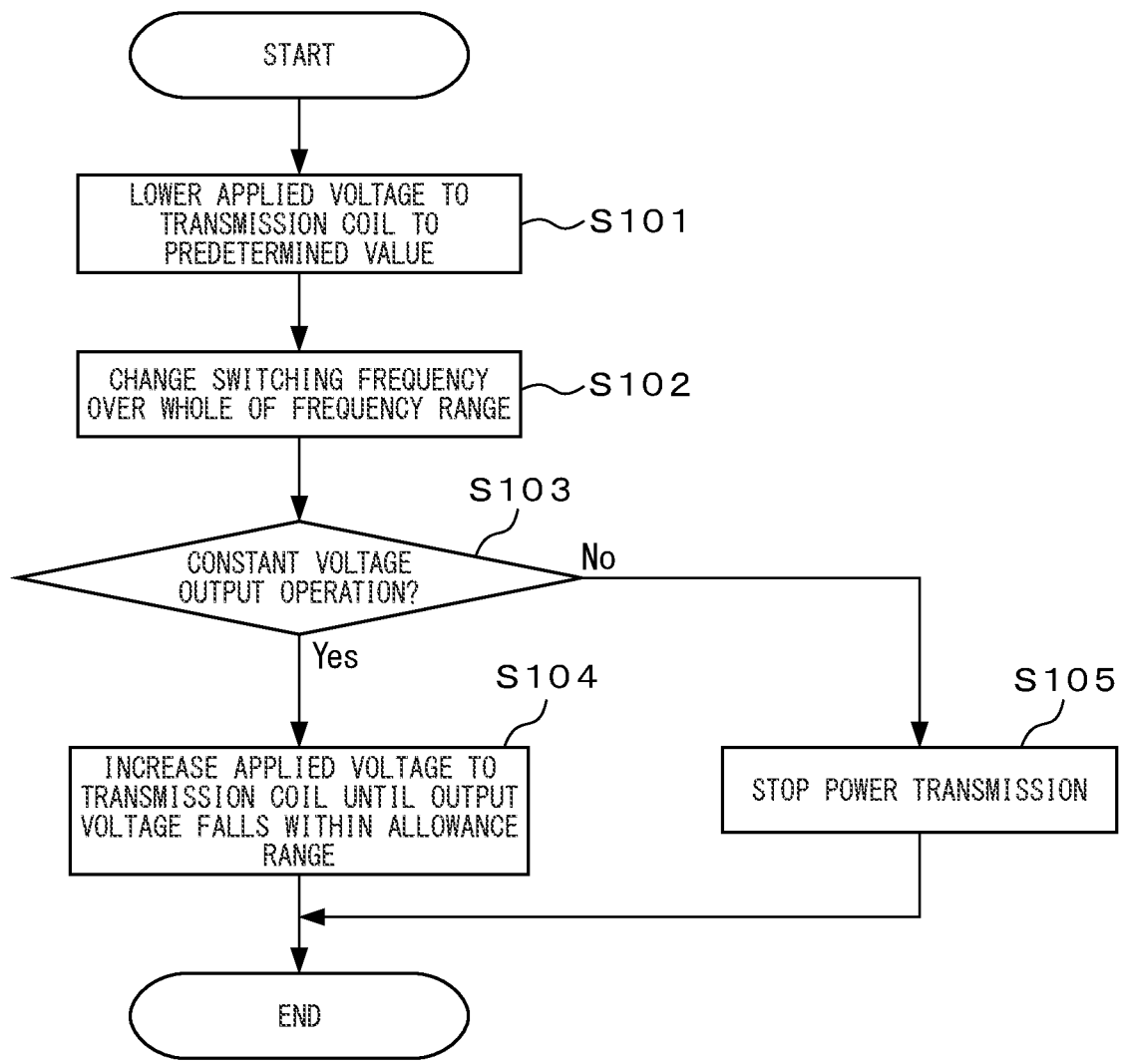
FIG. 8 is an operation flowchart of abnormal stop processing.

FIG. 8 is an operation flowchart of abnormal stop processing performed by the control circuit 17.

When determination information received from the power reception device 3 indicates that a constant voltage output operation is not performed, the control circuit 17 controls the power supply circuit 10 to lower voltage of AC power supplied to the transmission coil 14 (step S101) to a predetermined amount.

The control circuit 17 controls the power supply circuit 10 to successively raise switching frequency from the lower limit to the upper limit of a predetermined frequency range within which switching frequency is adjusted (step S102). The control circuit 17 determines, referring to determination information received from the power reception device 3, whether or not it is indicated that the constant voltage output operation is performed at any switching frequency (step S103).

When it is indicated that the constant voltage output operation is performed at any switching frequency (Yes in step S103), the control circuit 17 controls the power supply circuit 10 in such a way that AC power having the switching frequency is supplied to the transmission coil 14. Further, the control circuit 17 controls the power supply circuit 10 to raise the voltage of the AC power supplied to the transmission coil 14 until output voltage from the resonance circuit 20 of the power reception device 3 falls within a predetermined allowance range of voltage (step S104).

On the other hand, when it is not indicated that the constant voltage output operation is performed at any switching frequency (No in step S103), the non-contact power supply device 1 is unable to perform the constant voltage output operation within the predetermined frequency range, i.e., within an expected range of coupling coefficient. Therefore, it is determined that a foreign object made of metal has intruded between the transmission coil 14 and the reception coil 21. Thus, the control circuit 17 stops power supply from the power supply circuit 10 to the transmission coil 14 and thereby stops power transmission from the power transmission device 2 to the power reception device 3 (step S105). Further, the control circuit 17 may output an abnormality signal indicating that a foreign object made of metal has been detected to another device via a not-illustrated interface.

After step S104 or S105, the control circuit 17 terminates the abnormal stop processing.

As described in the foregoing, the non-contact power supply device changes, when ceasing to perform a constant voltage output operation, the switching frequency of the AC power supplied to the transmission coil of the power transmission device within a frequency range according to the expected coupling coefficient between the transmission coil and the reception coil. When the constant voltage output operation is not achieved even when the switching frequency is changed over the whole of the frequency range, the non-contact power supply device determines that a foreign object made of metal has intruded between the transmission coil and the reception coil and stops power transmission from the power transmission device to the power reception device. This configuration enables the non-contact power supply device to detect a foreign object made of metal that has intruded between the transmission coil and the reception coil even when the coupling coefficient between the transmission coil and the reception coil changes and prevent a malfunction due to the foreign object having intruded from occurring.

Note that there is a possibility that, depending on a foreign object that has intruded between the transmission coil and the reception coil, the output voltage from the resonance circuit of the power reception device hardly changes due to variation in leakage inductance and winding resistance.

Figure 9:
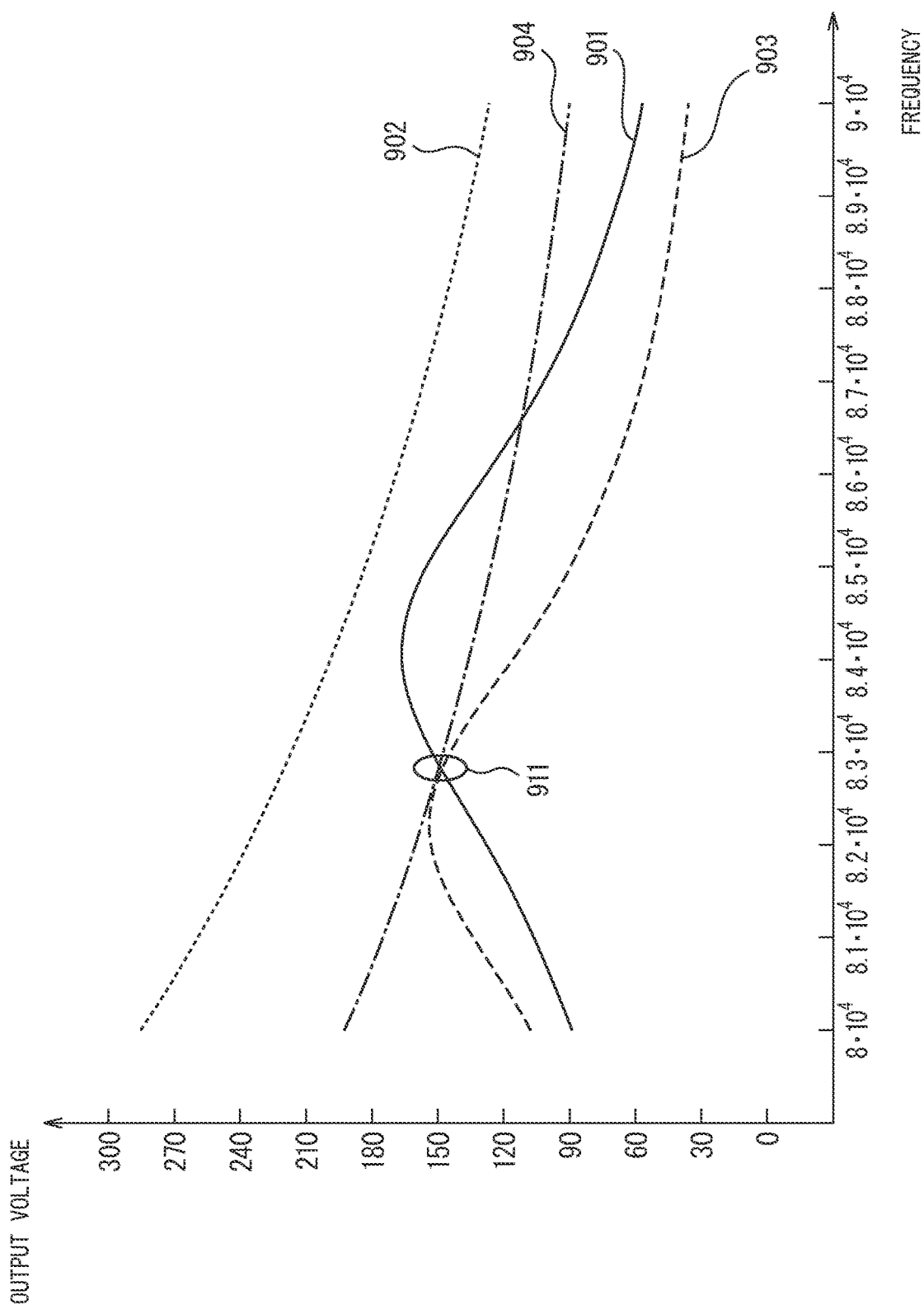
FIG. 9 is a diagram illustrating an example of simulation results of frequency responses of the output voltage from the non-contact power supply device at the time of intrusion of a foreign object.

FIG. 9 is a diagram illustrating an example of simulation results of frequency responses of output voltage from the non-contact power supply device at the time of intrusion of a foreign object. In FIG. 9, frequency is plotted along the horizontal axis and output voltage is plotted along the vertical axis. Graph 901 represents a frequency response of the output voltage when a foreign object has intruded between the transmission coil 14 and the reception coil 21, the coupling coefficient k is set as k=0.15, and the AC equivalent resistance of the load circuit is set at Rac. In addition, graph 902 represents a frequency response of the output voltage when a foreign object has intruded between the transmission coil 14 and the reception coil 21, the coupling coefficient k is set as k=0.15, and the AC equivalent resistance of the load circuit is set at (10*Rac). In addition, graph 903 represents a frequency response of the output voltage when no foreign object has intruded, the coupling coefficient k is set as k=0.15, and the AC equivalent resistance of the load circuit is set at Rac. In addition, graph 904 represents a frequency response of the output voltage when no foreign object has intruded, the coupling coefficient k is set as k=0.15, and the AC equivalent resistance of the load circuit is set at (10*Rac). Note that, in the example, with respect to the graphs 901 and 902, the values of the parameters used in the simulation in FIG. 2 except the value of the leakage inductance Lr, which is decreased by 30 µH from that in the simulation in FIG. 2, and the winding resistance Ri on the power transmission side and the winding resistance Ris on the power reception side, which are respectively decreased by 3Ω from those in the simulation in FIG. 2, were used as parameters of the respective circuit elements.

When the graphs 901 and 903 are compared with each other, it is revealed that intrusion of a foreign object causes a peak value and the waveform of the output voltage to hardly change and the waveform to slightly shift to the high frequency side. Thus, at a frequency at which a constant voltage output operation is performed when no foreign object has intruded, indicated by a point 911, the output voltage hardly changes between when a foreign object has intruded and when not intruded in the case where the AC equivalent resistance of the load circuit 27 is Rac. Therefore, measured values of the output voltage from the resonance circuit 20 of the power reception device 3 stays within the allowance range of voltage and, unless the resistance of the load circuit 27 changes, there is a possibility that it is erroneously determined that constant voltage output operation is continuing. In reality, as illustrated by the graphs 901 and 902, the intrusion of a foreign object causes the output voltage from the resonance circuit 20 to vary in response to variation in the resistance of the load circuit 27, and therefore the non-contact power supply device 1 is not performing the constant voltage output operation.

In addition, the inventors have found that a frequency at which a constant voltage output operation is performed is included in a frequency range in which the output voltage decreases as frequency increases. From this matter, it is estimated that a foreign object has intruded if, as illustrated by the graph 901, the output voltage increases when the switching frequency is raised from a switching frequency (the point 911 in FIG. 9) at which a constant voltage output operation is continued in appearance.

Accordingly, according to a variation, every time acquiring a measured value of output voltage measured by the voltage detection circuit 28, the determination circuit 30 of the constant voltage determination circuit 29 stores the measured value for a predetermined duration (for example, several tens of msec). The determination circuit 30 calculates a change amount Δv of the output voltage by subtracting a stored measured value of the output voltage the predetermined duration earlier from a latest measured value of the output voltage. The determination circuit 30 includes the change amount Δv of the output voltage in determination information and transmits the determination information to the power transmission device 2 via the transmitter 32. On the other hand, even when the control circuit 17 of the power transmission device 2 continuously receives determination information indicating that measured values of the output voltage fall within the allowance range of voltage from the power reception device 3, the control circuit 17 periodically raises the switching frequency only by a predetermined amount Δf and determines that a foreign object made of metal has intruded between the transmission coil 14 and the reception coil 21 and stops power transmission, when a change amount Δv of the output voltage at the moment indicates an increase.

Figure 10:
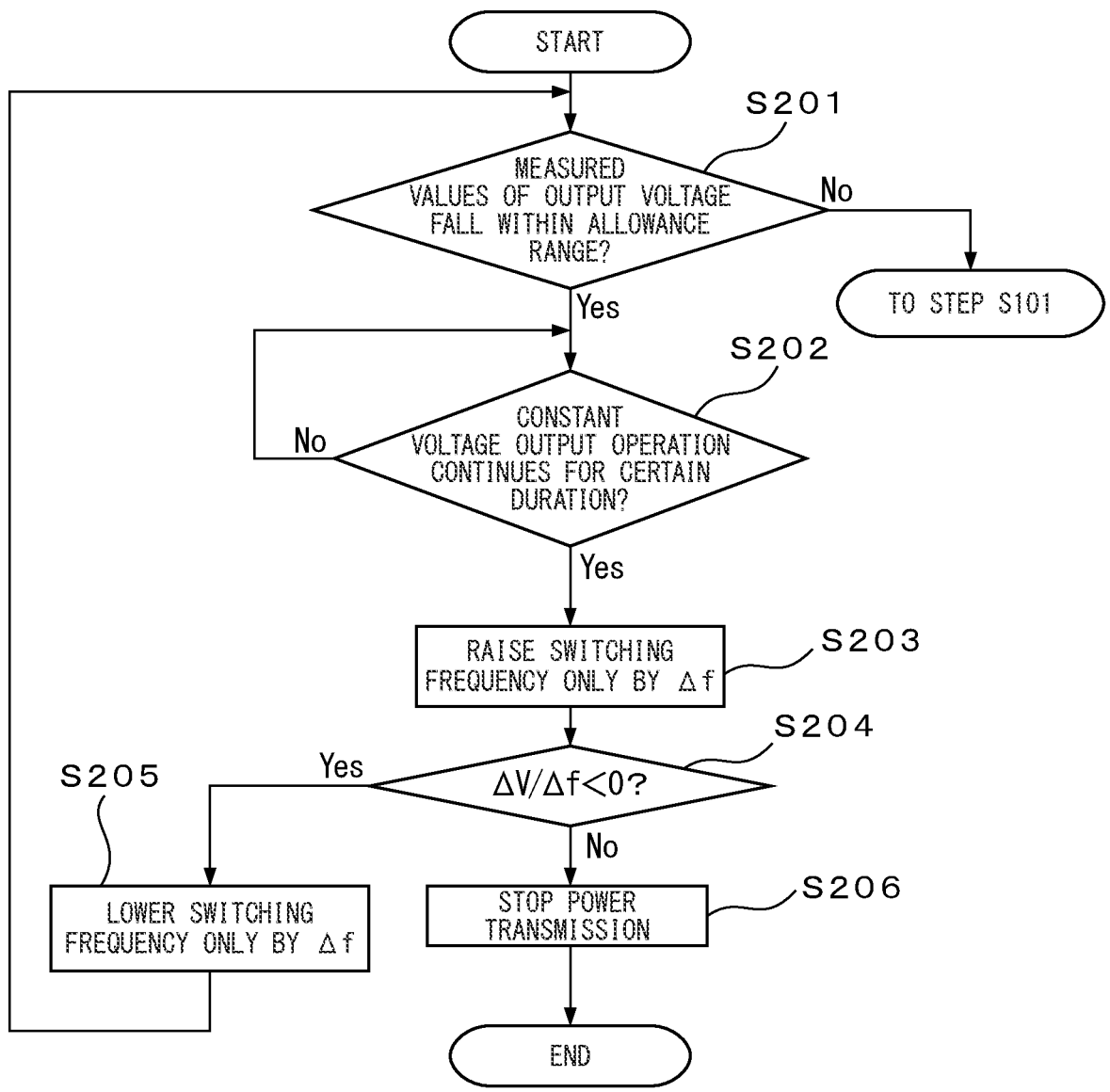
FIG. 10 is an operation flowchart of abnormal stop processing according to a variation.

FIG. 10 is an operation flowchart of abnormal stop processing performed by the control circuit 17 according to the variation. The control circuit 17 may perform the abnormal stop processing in accordance with the operation flowchart described below.

The control circuit 17 determines whether or not determination information received from the power reception device 3 indicates that measured values of output voltage from the resonance circuit 20 fall within an allowance range of voltage (step S201). When the determination information indicates that measured values of the output voltage from the resonance circuit 20 are out of the allowance range of voltage (No in step S201), there is a possibility that, in this case, the coupling coefficient has changed or a foreign object has intruded between the transmission coil 14 and the reception coil 21. Thus, the control circuit 17 performs processing of step S101 and subsequent steps in FIG. 8.

On the other hand, when the determination information indicates that measured values of the output voltage from the resonance circuit 20 fall within the allowance range of voltage (Yes in step S201), the control circuit 17 determines whether or not the control circuit 17 has received determination information indicating that a constant voltage output operation is performed from the power reception device 3 continuously for a fixed duration (step S202). When the duration for which the determination information indicating that the constant voltage output operation is performed has been received has not reached the fixed duration (No in step S202), the control circuit 17 stands by for a predetermined period of time and subsequently repeats the processing in step S202.

On the other hand, when the duration for which the determination information indicating that the constant voltage output operation is performed has been received has reached the fixed duration (Yes in step S202), the control circuit 17 raises switching frequency of AC power supplied from the power supply circuit 10 to the transmission coil 14 only by a predetermined width Δf (step S203). The control circuit 17 refers to a change amount Δv of the output voltage included in determination information received from the power reception device 3 after having raised the switching frequency and determines whether or not Δv/Δf has a negative value (step S204). When Δv/Δf has a negative value, i.e., the output voltage from the resonance circuit 20 of the power reception device 3 decreases in response to the increase in the switching frequency (Yes in step S204), the control circuit 17 determines that no foreign object has intruded between the transmission coil 14 and the reception coil 21. Thus, the control circuit 17 lowers the switching frequency of the AC power supplied from the power supply circuit 10 to the transmission coil 14 only by the predetermined width Δf (step S205). In other words, the control circuit 17 returns the switching frequency to the original switching frequency. The control circuit 17 repeats the processing from step S201 onward.

On the other hand, when Δv/Δf has a positive value, i.e., the output voltage from the resonance circuit 20 of the power reception device 3 increases in response to the increase in the switching frequency (No in step S204), the control circuit 17 determines that a foreign object has intruded between the transmission coil 14 and the reception coil 21. Thus, the control circuit 17 stops power supply from the power supply circuit 10 to the transmission coil 14 and thereby stops power transmission from the power transmission device 2 to the power reception device 3 (step S206). Note that, in the variation, the control circuit 17 may also output an abnormality signal indicating that a foreign object made of metal has been detected to another device via a not-illustrated interface.

After step S206, the control circuit 17 terminates the abnormal stop processing. Note that, when not only a foreign object has intruded but also the coupling coefficient has changed, the output voltage sometimes hardly changes. Thus, even when, in step S204, the output voltage from the resonance circuit 20 of the power reception device 3 increases in response to an increase in the switching frequency, the control circuit 17 may, in place of immediately stopping power transmission, perform the processing of step S101 and subsequent steps in FIG. 8 and determine whether or not to stop power transmission.

According to the variation, even when the output voltage from the resonance circuit 20 of the power reception device 3 hardly changes when a foreign object made of metal has intruded between the transmission coil 14 and the reception coil 21, the non-contact power supply device is capable of detecting the foreign object having intruded and preventing a malfunction due to the foreign object having intruded from occurring.

Note that the non-contact power supply device capable of determining intrusion of a foreign object is not limited to the above-described embodiment and may be a non-contact power supply device that is capable of performing a constant voltage output operation within a certain allowance range of voltage variation by adjusting switching frequency and voltage of AC power supplied to the transmission coil.

For example, the non-contact power supply device may be a non-contact power supply device according to the SPL method. In this case, in the non-contact power supply device illustrated in FIG. 5, the power transmission device 2 may include a capacitor that is connected in series with the transmission coil 14. The power supply circuit 10 may supply AC power having a switching frequency at which a resonance circuit constituted by the transmission coil 14 and the capacitor (hereinafter, referred to as a resonance circuit on the power transmission side for discrimination from the resonance circuit 20 of the power reception device 3) resonates to the resonance circuit on the power transmission side.

Figure 11:
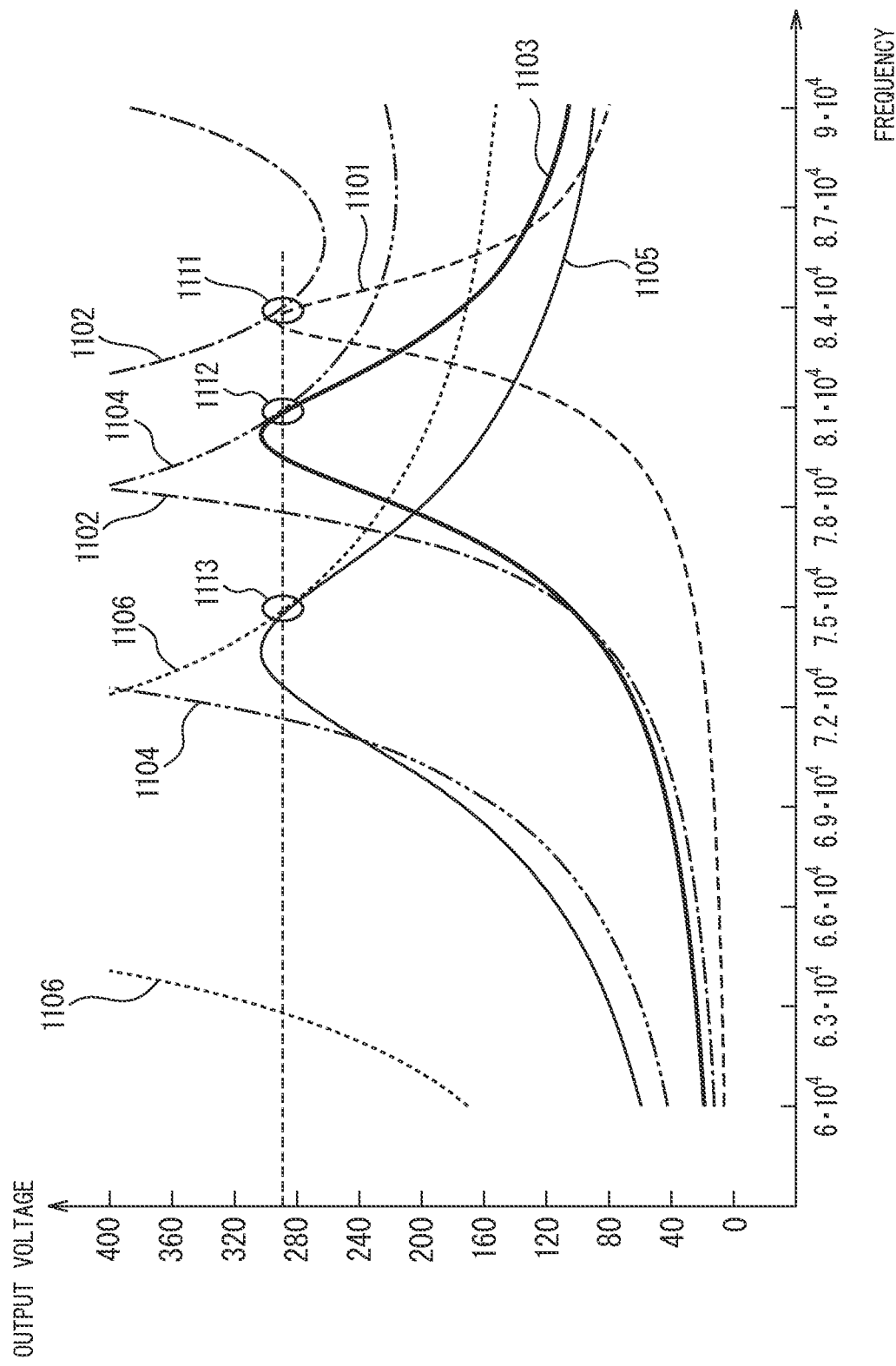
FIG. 11 is a diagram illustrating an example of simulation results of frequency responses of the output voltage when voltage applied to a resonance circuit on the power transmission side is changed in accordance with the coupling coefficient in the simulation illustrated in FIG. 2 relating to the non-contact power supply device according to the SPL method.

FIG. 11 is a diagram illustrating an example of simulation results of frequency responses of the output voltage when voltage applied to the resonance circuit on the power transmission side is changed in accordance with the coupling coefficient in the simulation illustrated in FIG. 2 relating to the non-contact power supply device according to the SPL method. In FIG. 11, frequency is plotted along the horizontal axis and output voltage is plotted along the vertical axis. Note that, in the simulation, the same values as the values of parameters of the respective circuit elements used in the simulation illustrated in FIG. 2 were used. Graph 1101 represents a frequency response of the output voltage when the coupling coefficient k is set as k=0.15, the AC equivalent resistance of the load circuit 27 is set at Rac, and the voltage applied to the transmission coil is set at (0.4*Vin). In addition, graph 1102 represents a frequency response of the output voltage when the coupling coefficient k is set as k=0.15, the AC equivalent resistance of the load circuit 27 is set at (10*Rac), and the voltage applied to the transmission coil is set at (0.4*Vin). In addition, graph 1103 represents a frequency response of the output voltage when the coupling coefficient k is set as k=0.3, the AC equivalent resistance of the load circuit 27 is set at Rac, and the voltage applied to the transmission coil is set at (0.67*Vin). In addition, graph 1104 represents a frequency response of the output voltage when the coupling coefficient k is set as k=0.3, the AC equivalent resistance of the load circuit 27 is set at (10*Rac), and the voltage applied to the transmission coil is set at (0.67*Vin). Further, graph 1105 represents a frequency response of the output voltage when the coupling coefficient k is set as k=0.6, the AC equivalent resistance of the load circuit 27 is set at Rac, and the voltage applied to the transmission coil is set at Vin. In addition, graph 1106 represents a frequency response of the output voltage when the coupling coefficient k is set as k=0.6, the AC equivalent resistance of the load circuit 27 is set at (10*Rac), and the voltage applied to the transmission coil is set at Vin.

As illustrated by points 1111 to 1113, output voltages in respective combinations of a frequency and an output voltage at which the output voltage becomes substantially constant (i.e., a constant voltage is output) even when the AC equivalent resistance of the load circuit 27 changes under the condition that the coupling coefficient k does not change are substantially equal to one another. Therefore, it is revealed that, in the SPL method, the non-contact power supply device is also capable of, by adjusting the switching frequency and voltage of the AC power applied to the resonance circuit on the power transmission side, performing a constant voltage output operation and maintaining a substantially constant output voltage. In addition, in the example, frequencies at which a constant voltage output operation is performed also exist within frequency ranges in which the output voltage decreases as frequency increases.

Figure 12:
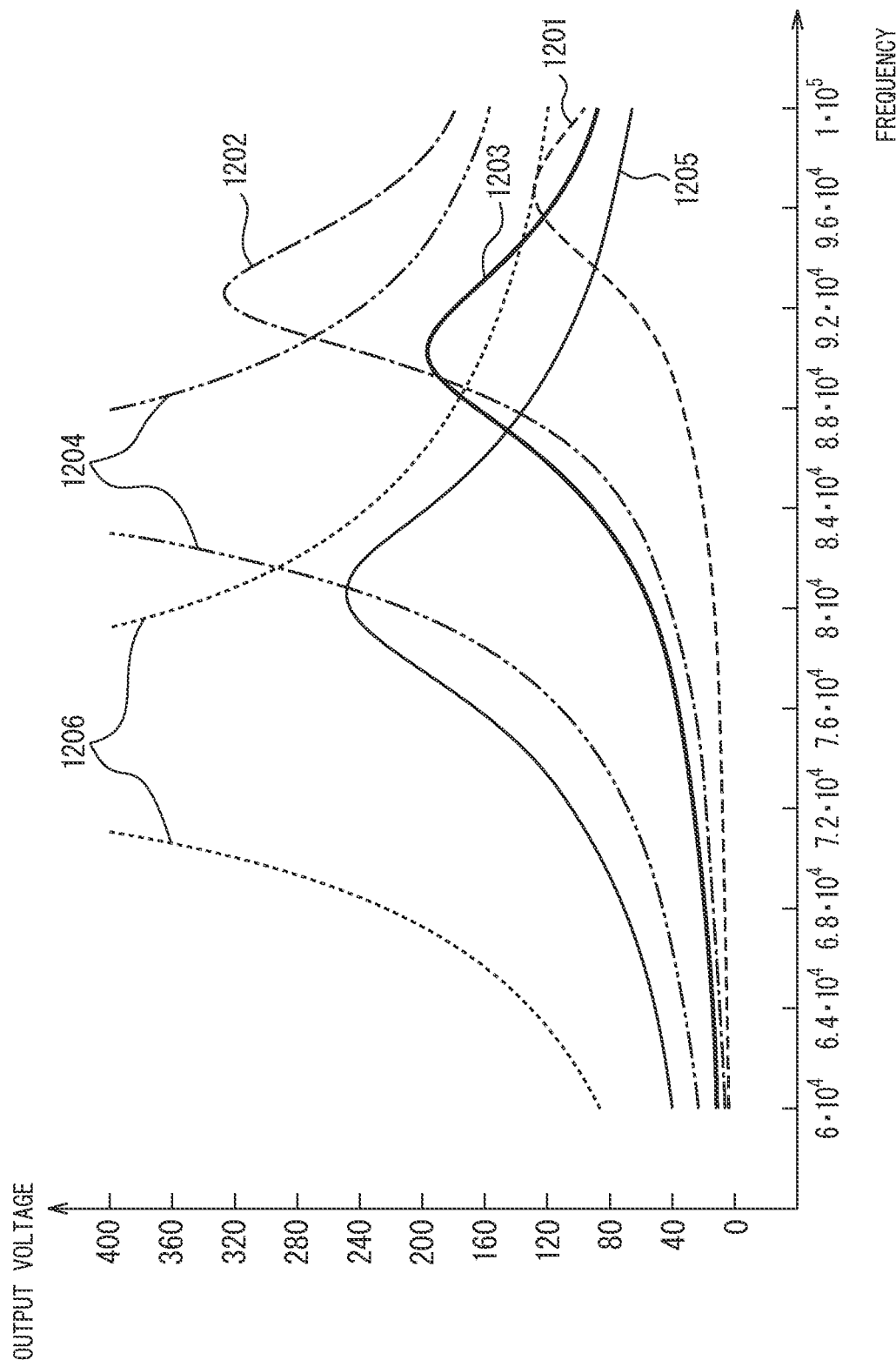
FIG. 12 is a diagram illustrating an example of simulation results of frequency responses of the output voltage when the voltage applied to the resonance circuit on the power transmission side is changed in accordance with the coupling coefficient at the time of intrusion of a foreign object, in the simulation illustrated in FIG. 11.

FIG. 12 is a diagram illustrating an example of simulation results of frequency responses of the output voltage with respect to the non-contact power supply device according to the SPL method when voltage applied to the resonance circuit on the power transmission side is changed in accordance with the coupling coefficient at the time of intrusion of a foreign object, in the simulation illustrated in FIG. 11. In FIG. 12, frequency is plotted along the horizontal axis and output voltage is plotted along the vertical axis. Note that, in the simulation, the values of the parameters used in the simulation in FIG. 2 except the value of the leakage inductance Lr, which is decreased by 30 μH from that in the simulation in FIG. 2, and the winding resistance Ri on the power transmission side and the winding resistance Ris on the power reception side, which are respectively increased by 3Ω from those in the simulation in FIG. 2, were used as parameters of the respective circuit elements. Graph 1201 represents a frequency response of the output voltage when the coupling coefficient k is set as k=0.15, the AC equivalent resistance of the load circuit 27 is set at Rac, and the voltage applied to the transmission coil is set at (0.4*Vin). In addition, graph 1202 represents a frequency response of the output voltage when the coupling coefficient k is set as k=0.15, the AC equivalent resistance of the load circuit 27 is set at (10*Rac), and the voltage applied to the transmission coil is set at (0.4*Vin). In addition, graph 1203 represents a frequency response of the output voltage when the coupling coefficient k is set as k=0.3, the AC equivalent resistance of the load circuit 27 is set at Rac, and the voltage applied to the transmission coil is set at (0.67*Vin). In addition, graph 1204 represents a frequency response of the output voltage when the coupling coefficient k is set as k=0.3, the AC equivalent resistance of the load circuit 27 is set at (10*Rac), and the voltage applied to the transmission coil is set at (0.67*Vin). Further, graph 1205 represents a frequency response of the output voltage when the coupling coefficient k is set as k=0.6, the AC equivalent resistance of the load circuit 27 is set at Rac, and the voltage applied to the transmission coil is set at Vin. In addition, graph 1206 represents a frequency response of the output voltage when the coupling coefficient k is set as k=0.6, the AC equivalent resistance of the load circuit 27 is set at (10*Rac), and the voltage applied to the transmission coil is set at Vin.

As illustrated in FIG. 12, it is revealed that, at any of the coupling coefficients, the output voltage substantially varies due to variation in the AC equivalent resistance of the load circuit 27 and the non-contact power supply device ceases to perform a constant voltage output operation.

Therefore, the non-contact power supply device according to the SPL method is also capable of determining whether or not a foreign object made of metal has intruded between the transmission coil and the reception coil by the control circuit of the power transmission device performing the abnormal stop processing in accordance with the operation flowchart illustrated in FIG. 8 or 10 and stopping power transmission from the power transmission device to the power reception device when determining that a foreign object made of metal has intruded.

In addition, in the non-contact power supply device according to the SPL method, the resonance capacitor of the resonance circuit on the power reception side may be omitted. In this case also, the non-contact power supply device is capable of performing a constant voltage output operation. In the variation, in the non-contact power supply device illustrated in FIG. 5, the power transmission device 2 may include a capacitor that is connected in series with the transmission coil 14, and the resonance capacitor 22 may be omitted from the resonance circuit 20 of the power reception device 3. A non-contact power supply device according to the variation is, hereinafter, referred to as a non-contact power supply device according to the SL method for the purpose of convenience.

Figure 13:
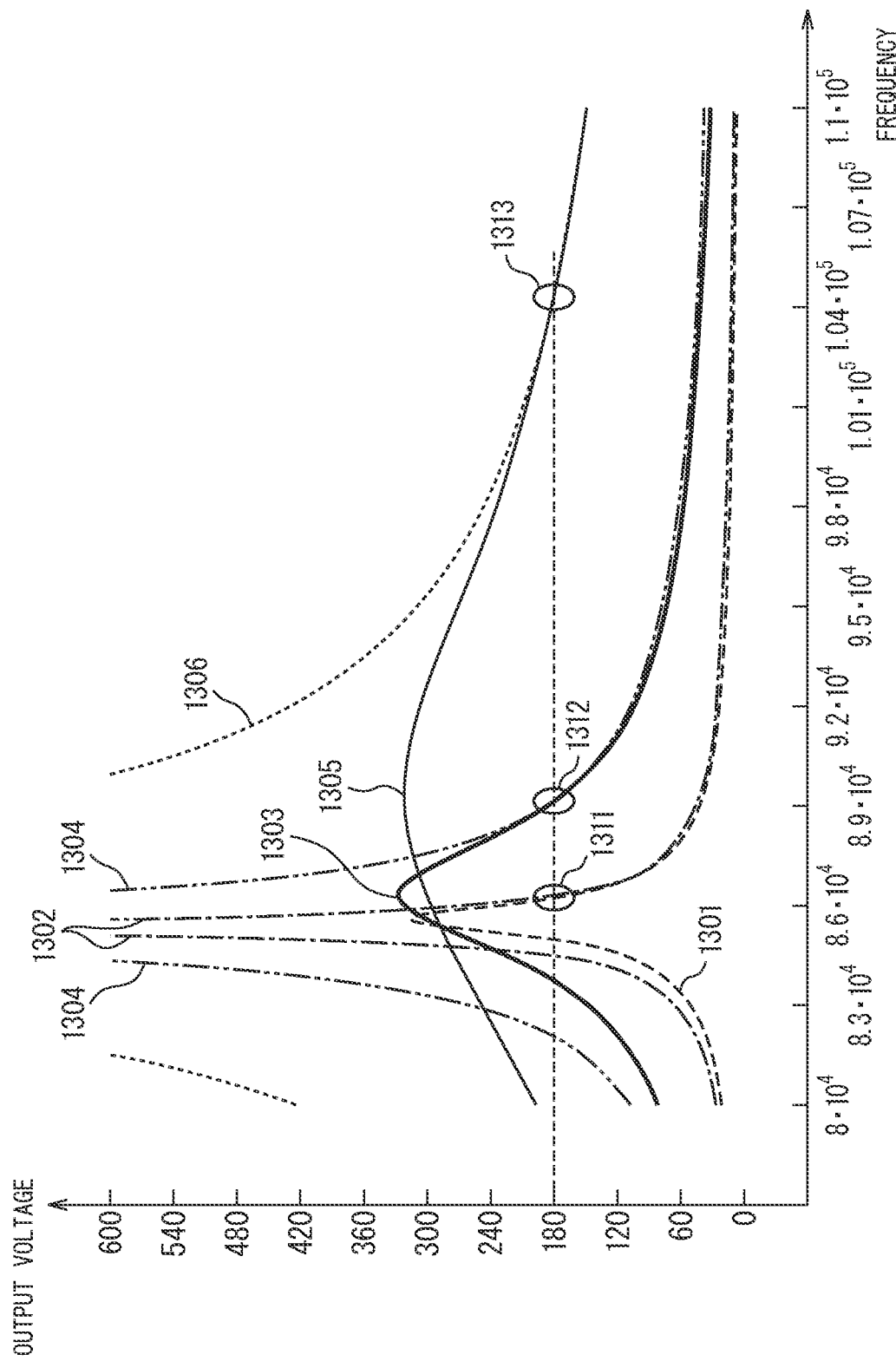
FIG. 13 is a diagram illustrating an example of simulation results of frequency responses of output voltage when voltage applied to a resonance circuit on the power transmission side is changed in accordance with the coupling coefficient, with respect to a non-contact power supply device according to the SL method.

FIG. 13 is a diagram illustrating an example of simulation results of frequency responses of the output voltage when voltage applied to the resonance circuit on the power transmission side is changed in accordance with the coupling coefficient, with respect to the non-contact power supply device according to the SL method. In FIG. 13, frequency is plotted along the horizontal axis and output voltage is plotted along the vertical axis. Note that, in the simulation, it is assumed that Lp=174 μH, Cr1=20 nF, Lop=3Lp, Ri=Ris=0.04Ω, n=1, Vin=200 V, and Ro=200Ω (Rac≅162.1Ω). Graph 1301 represents a frequency response of the output voltage when the coupling coefficient k is set as k=0.15, the AC equivalent resistance of the load circuit 27 is set at Rac, and the voltage applied to the transmission coil is set at (0.25*Vin). In addition, graph 1302 represents a frequency response of the output voltage when the coupling coefficient k is set as k=0.15, the AC equivalent resistance of the load circuit 27 is set at (10*Rac), and the voltage applied to the transmission coil is set at (0.25*Vin). In addition, graph 1303 represents a frequency response of the output voltage when the coupling coefficient k is set as k=0.3, the AC equivalent resistance of the load circuit 27 is set at Rac, and the voltage applied to the transmission coil is set at (0.5*Vin). In addition, graph 1304 represents a frequency response of the output voltage when the coupling coefficient k is set as k=0.3, the AC equivalent resistance of the load circuit 27 is set at (10*Rac), and the voltage applied to the transmission coil is set at (0.5*Vin). Further, graph 1305 represents a frequency response of the output voltage when the coupling coefficient k is set as k=0.6, the AC equivalent resistance of the load circuit 27 is set at Rac, and the voltage applied to the transmission coil is set at Vin. Moreover, graph 1306 represents a frequency response of the output voltage when the coupling coefficient k is set as k=0.6, the AC equivalent resistance of the load circuit 27 is set at (10*Rac), and the voltage applied to the transmission coil is set at Vin.

As illustrated by points 1311 to 1313, output voltages in respective combinations of a frequency and an output voltage at which the output voltage becomes substantially constant (i.e., a constant voltage is output) even when the AC equivalent resistance of the load circuit 27 changes under the condition that the coupling coefficient k does not change are substantially equal to one another. Therefore, it is revealed that, in the SL method, the non-contact power supply device is also capable of, by adjusting the switching frequency and voltage of the AC power applied to the resonance circuit on the power transmission side, performing a constant voltage output operation and maintaining a substantially constant output voltage. In addition, in the example, frequencies at which a constant voltage output operation is performed also exist within frequency ranges in which the output voltage decreases as frequency increases.

Figure 14:
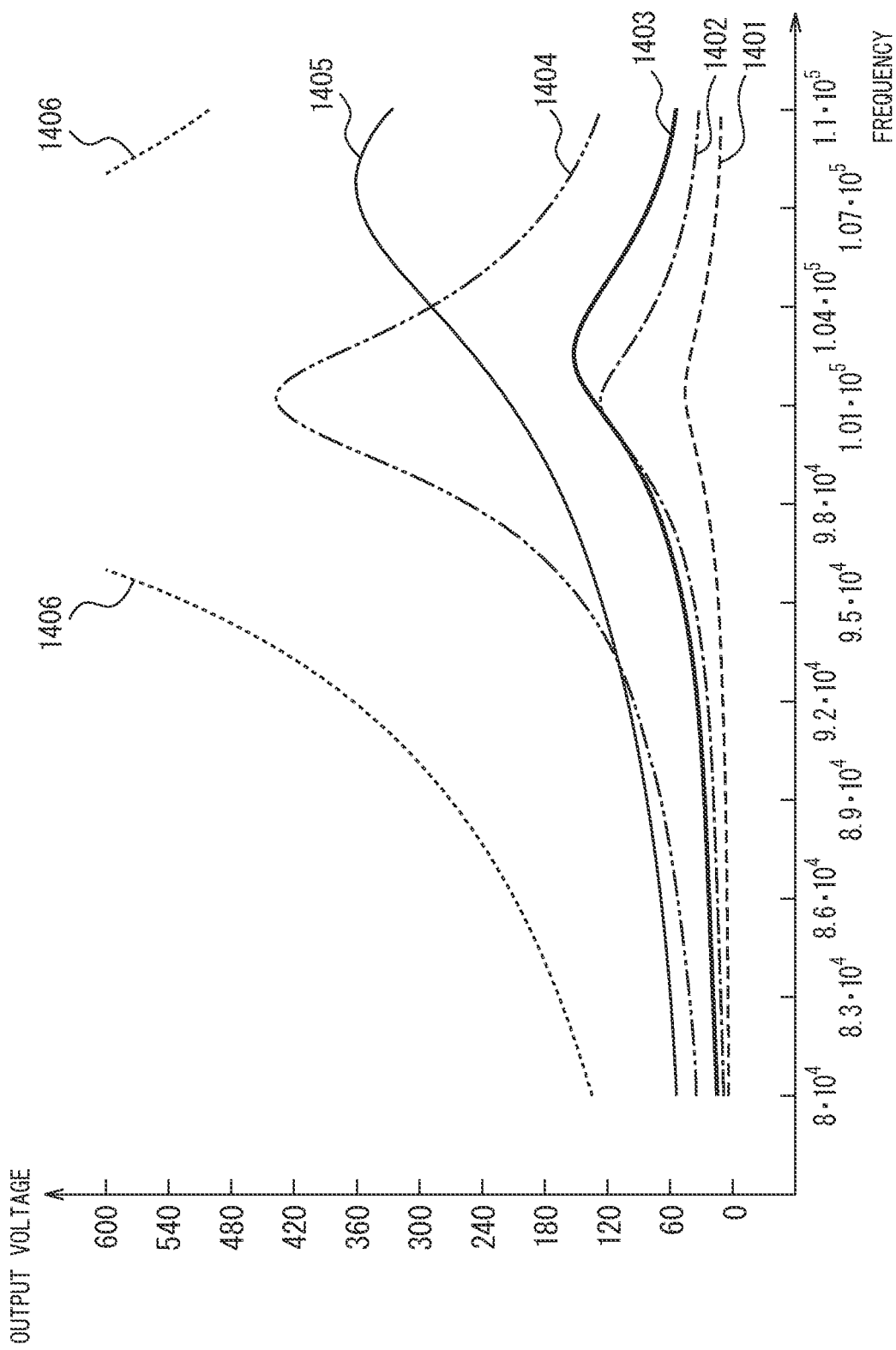
FIG. 14 is a diagram illustrating an example of simulation results of frequency responses of the output voltage when the voltage applied to the resonance circuit on the power transmission side is changed in accordance with the coupling coefficient at the time of intrusion of a foreign object, in the simulation illustrated in FIG. 13.

FIG. 14 is a diagram illustrating an example of simulation results of frequency responses of the output voltage with respect to the non-contact power supply device according to the SL method when voltage applied to the resonance circuit on the power transmission side is changed in accordance with the coupling coefficient at the time of intrusion of a foreign object, in the simulation illustrated in FIG. 13. In FIG. 14, frequency is plotted along the horizontal axis and output voltage is plotted along the vertical axis. Note that, in the simulation, the values of the parameters used in the simulation in FIG. 13 except the value of the leakage inductance Lr, which is decreased by 30 µH from that in the simulation in FIG. 13, and the winding resistance Ri on the power transmission side and the winding resistance Ris on the power reception side, which are respectively increased by 3Ω from those in the simulation in FIG. 13, were used as parameters of the respective circuit elements. Graph 1401 represents a frequency response of the output voltage when the coupling coefficient k is set as k=0.15, the AC equivalent resistance of the load circuit 27 is set at Rac, and the voltage applied to the transmission coil is set at (0.25*Vin). In addition, graph 1402 represents a frequency response of the output voltage when the coupling coefficient k is set as k=0.15, the AC equivalent resistance of the load circuit 27 is set at (10*Rac), and the voltage applied to the transmission coil is set at (0.25*Vin). In addition, graph 1403 represents a frequency response of the output voltage when the coupling coefficient k is set as k=0.3, the AC equivalent resistance of the load circuit 27 is set at Rac, and the voltage applied to the transmission coil is set at (0.5*Vin). In addition, graph 1404 represents a frequency response of the output voltage when the coupling coefficient k is set as k=0.3, the AC equivalent resistance of the load circuit 27 is set at (10*Rac), and the voltage applied to the transmission coil is set at (0.5*Vin). Further, graph 1405 represents a frequency response of the output voltage when the coupling coefficient k is set as k=0.6, the AC equivalent resistance of the load circuit 27 is set at Rac, and the voltage applied to the transmission coil is set at Vin. Moreover, graph 1406 represents a frequency response of the output voltage when the coupling coefficient k is set as k=0.6, the AC equivalent resistance of the load circuit 27 is set at (10*Rac), and the voltage applied to the transmission coil is set at Vin.

As illustrated in FIG. 14, it is revealed that, at any of the coupling coefficients, the output voltage substantially varies due to variation in the AC equivalent resistance of the load circuit 27 and the non-contact power supply device ceases to perform constant voltage output operation.

Therefore, the non-contact power supply device according to the SL method is also capable of determining whether or not a foreign object made of metal has intruded between the transmission coil and the reception coil by the control circuit of the power transmission device performing the abnormal stop processing in accordance with the operation flowchart illustrated in FIG. 8 or 10 and stopping power transmission from the power transmission device to the power reception device when determining that a foreign object made of metal has intruded.

In addition, the inventors have found that when the resistance of the load circuit of the power reception device has a preset value, the input impedance of the non-contact power supply device according to the above-described embodiment or its variations has a local minimum value at a frequency at which the non-contact power supply device performs the constant voltage output operation.

FIG. 15 is a diagram illustrating an example of a relationship between frequency responses of the output voltage from and frequency responses of the input impedance of the non-contact power supply device 1 illustrated in FIG. 5. In the upper side graph in FIG. 15, frequency is plotted along the horizontal axis and output voltage is plotted along the vertical axis. In addition, in the lower side graph in FIG. 15, frequency is plotted along the horizontal axis and input impedance is plotted along the vertical axis. Note that, in the simulation, the same values as the values of parameters of the respective circuit elements used in the simulation illustrated in FIG. 2 were used. In the upper side graph, graph 1501 (the same as the graph 203 in FIG. 2) represents a frequency response of the output voltage from the non-contact power supply device 1 when the coupling coefficient k is set as k=0.3 and the AC equivalent resistance of the load circuit 27 is set at Rac. In addition, graph 1502 (the same as the graph 204 in FIG. 2) represents a frequency response of the output voltage from the non-contact power supply device 1 when the coupling coefficient k is set as k=0.3 and the AC equivalent resistance of the load circuit 27 is set at (10*Rac). In addition, in the lower side graph, graph 1511 represents a frequency response of the input impedance of the non-contact power supply device 1 when the coupling coefficient k is set as k=0.3 and the AC equivalent resistance of the load circuit 27 is set at Rac. Further, graph 1512 represents a frequency response of the input impedance of the non-contact power supply device 1 when the coupling coefficient k is set as k=0.3 and the AC equivalent resistance of the load circuit 27 is set at (100*Rac).

As illustrated in FIG. 15, at frequency f0 at which the non-contact power supply device 1 performs a constant voltage output operation, the input impedance when the AC equivalent resistance of the load circuit 27 is set at Rac has a local minimum value. In other words, current flowing through the transmission coil 14 has a local maximum value at the frequency f0.

Thus, according to a variation, the control circuit of the power transmission device may determine whether or not the non-contact power supply device performs a constant voltage output operation, on the basis of a frequency response of current flowing through the transmission coil and, depending on a result of the determination, determine whether or not a foreign object has intruded.

Figure 16:
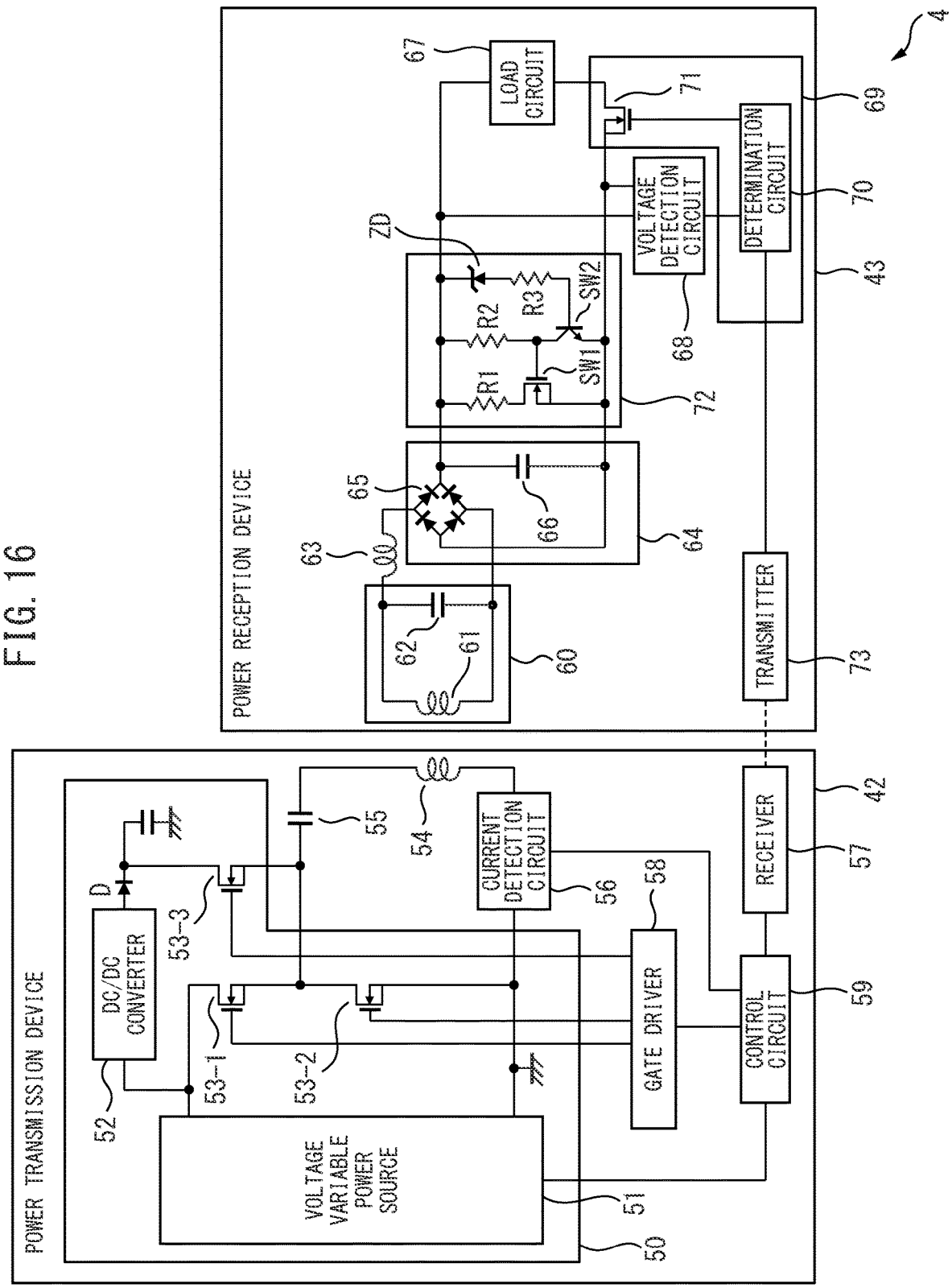
FIG. 16 is a schematic configuration view of a non-contact power supply device according to a variation.

FIG. 16 is a schematic configuration view of a non-contact power supply device according to the variation. As illustrated in FIG. 16, a non-contact power supply device 4 includes a power transmission device 42 and a power reception device 43 to which power is transmitted from the power transmission device 42 through space without contact. The power transmission device 42 includes a power supply circuit 50, a transmission coil 54, a capacitor 55, a current detection circuit 56, a receiver 57, a gate driver 58, and a control circuit 59. On the other hand, the power reception device 43 includes a resonance circuit 60 including a reception coil 61 and a resonance capacitor 62, a coil 63, a rectification and smoothing circuit 64 including a full-wave rectification circuit 65 and a smoothing capacitor 66, a load circuit 67, a voltage detection circuit 68, a constant voltage determination circuit 69, a fixed load circuit 72, and a transmitter 73.

The non-contact power supply device 4 differs from the non-contact power supply device 1 illustrated in FIG. 5, with respect to the power transmission device 42, in the configuration of the power supply circuit 50, in including the capacitor 55 and the current detection circuit 56, and in a portion of control performed by the control circuit 59. In addition, with respect to the power reception device 43, the non-contact power supply device 4 differs from the non-contact power supply device 1 in including the fixed load circuit 72. Therefore, the above-described differences and related matters will be described below.

The power supply circuit 50 supplies the transmission coil 54 with AC power having adjustable switching frequency and adjustable voltage. To that end, the power supply circuit 50 includes a voltage variable power source 51, a DC/DC converter 52, and three switching elements 53-1 to 53-3.

The voltage variable power source 51 is a power source that supplies DC power and is capable of adjusting the voltage of the DC power in accordance with control from the control circuit 59. Note that the voltage variable power source 51 may have any of various circuit configurations that are capable of adjusting the voltage to be supplied. While the non-contact power supply device 4 is performing the constant voltage output operation, the DC power supplied from the voltage variable power source 51 is converted into AC power through the switching elements 53-1 and 53-2 and supplied to the transmission coil 54. On the other hand, while adjustment of switching frequency for the non-contact power supply device 4 to perform the constant voltage output operation is being carried out, the DC power supplied from the voltage variable power source 51 is supplied to the transmission coil 54 via the DC/DC converter 52 and the switching element 53-3.

The input terminal of the DC/DC converter 52 is connected to the positive electrode terminal of the voltage variable power source 51, and the output terminal of the DC/DC converter 52 is connected to one end of the capacitor 55 via a diode D and the switching element 53-3. The DC/DC converter 52 reduces the voltage of the DC power supplied from the voltage variable power source 51 to a predetermined voltage (for example, 5 V).

While adjustment of switching frequency for the non-contact power supply device 4 to perform the constant voltage output operation is being carried out, the voltage output from the DC/DC converter 52 is supplied to the transmission coil 54 via the diode D, the switching element 53-3, and the capacitor 55.

For each of the switching elements 53-1 to 53-3, for example, an n-channel MOSFET can be used. The switching elements 53-1 and 53-2 are connected in series between the positive electrode terminal and negative electrode terminal of the voltage variable power source 51. In addition, the switching element 53-1 is connected to the positive electrode side of the voltage variable power source 51, whereas the switching element 53-2 is connected to the negative electrode side of the voltage variable power source 51. The drain terminal of the switching element 53-1 is connected to the positive electrode terminal of the voltage variable power source 51, and the source terminal of the switching element 53-1 is connected to the drain terminal of the switching element 53-2. In addition, the source terminal of the switching element 53-1 and the drain terminal of the switching element 53-2 are connected to one end of the transmission coil 54 via the capacitor 55. Further, the source terminal of the switching element 53-2 is connected to the negative electrode terminal of the voltage variable power source 51 and the other end of the transmission coil 54 via the current detection circuit 56.

In addition, the drain terminal of the switching element 53-3 is connected to the output terminal of the DC/DC converter 52, and the source terminal of the switching element 53-3 is connected to one end of the transmission coil 54 via the capacitor 55. The gate terminals of the switching elements are connected to the gate driver 58.

While the non-contact power supply device 4 is performing the constant voltage output operation, the gate driver 58 keeps the switching element 53-3 in the off state in accordance with a control signal from the control circuit 59. In addition, the gate driver 58 alternately switches the switching elements 53-1 and 53-2 between on and off states at a switching frequency at which the constant voltage output operation is performed, in accordance with a control signal from the control circuit 59. In other words, when the switching element 53-1 is turned on and the switching element 53-2 is turned off, current flows to the transmission coil 54 in association with power being supplied from the voltage variable power source 51 through the switching element 53-1 to the capacitor 55 and the capacitor 55 being charged. On the other hand, when the switching element 53-1 is turned off and the switching element 53-2 is turned on, the capacitor 55 is discharged and current flows from the capacitor 55 to the transmission coil 54.

In addition, while adjustment of switching frequency for the non-contact power supply device 4 to perform the constant voltage output operation is being carried out, the gate driver 58 keeps the switching element 53-1 in the off state in accordance with a control signal from the control circuit 59 and, in turn, alternately switches the switching elements 53-3 and the switching element 53-2 between on and off states at the switching frequency in accordance with a control signal from the control circuit 59.

The capacitor 55 is connected between the transmission coil 54 and the power supply circuit 50. The capacitor 55 supplies the transmission coil 54 with AC power having the switching frequency by repeating being charged and discharged in response to switching of the switching elements between on and off states at the switching frequency. Note that it is preferable that the capacitance of the capacitor 55 be set in such a way that the resonance frequency of the transmission coil 54 and the capacitor 55 is lower than the resonance frequency of the resonance circuit 60 of the power reception device 43 and the lower limit frequency of a frequency range in which the switching frequency is adjusted so that the transmission coil 54 and the capacitor 55 do not operate as a resonance circuit in the frequency range in which the switching frequency is adjusted.

The current detection circuit 56 is connected between the transmission coil 54 and the power supply circuit 50 and measures current flowing through the transmission coil 54. The current detection circuit 56 outputs a measured value of the current to the control circuit 59. Note that the current detection circuit 56 may be connected to the transmission coil 54 in parallel with the capacitor 55 in conjunction with a capacitor for diversion (not illustrated) connected in series with the current detection circuit 56. In this case, the current detection circuit 56 is able to indirectly measure the current flowing through the transmission coil 54.

In addition, the constant voltage determination circuit 69 of the power reception device 43 includes a determination circuit 70 and a switching element 71 that are similar to the determination circuit 30 and the switching element 31 according to the above-described embodiment, respectively.

While measured values of the output voltage from the resonance circuit 60 measured by the voltage detection circuit 68 fall within the allowance range of voltage, i.e., the non-contact power supply device 4 is performing the constant voltage output operation, the determination circuit 70 of the constant voltage determination circuit 69 turns on the switching element 71 and thereby causes the output voltage from the resonance circuit 60 to be supplied to the load circuit 67 via the rectification and smoothing circuit 64. On the other hand, when measured values of the output voltage are out of the allowance range of voltage, the determination circuit 70 turns off the switching element 71, thereby causing the output voltage from the resonance circuit 60 not to be supplied to the load circuit 67.

The fixed load circuit 72 is connected to the rectification and smoothing circuit 64 in parallel with the load circuit 67 and, while adjustment of the switching frequency is being performed, provides the power reception device 43 with a load that is substantially equal to a load serving as a reference for the load circuit 67 (for example, Rac in the simulation illustrated in FIG. 9). To that end, the fixed load circuit 72 is connected to the rectification and smoothing circuit 64 in parallel with the load circuit 67 and includes a resistor R1 that has a resistance corresponding to the load serving as a reference for the load circuit 67. The resistor R1 is connected in series with a switching element SW1, which is an n-channel MOSFET. Further, the fixed load circuit 72 includes, between both output terminals of the rectification and smoothing circuit 64, a resistor R2 and a switching element SW2, which is an npn bipolar transistor, that are connected in series in this order from the positive electrode side. In addition, the resistor R2 and the switching element SW2 are connected in parallel with the resistor R1. The gate terminal of the switching element SW1 is connected between the resistor R2 and one end (in this example, the collector terminal) of the switching element SW2. Further, the base terminal of the switching element SW2 is connected to the positive electrode terminal of the rectification and smoothing circuit 64 via a resistor R3 and a Zener diode ZD, which is reverse-biased.

While the non-contact power supply device 4 is performing the constant voltage output operation, the output voltage from the resonance circuit 60 is higher than the breakdown voltage of the Zener diode ZD and, as a result, current is supplied to the base terminal of the switching element SW2 via the Zener diode ZD and the resistor R3, turning on the switching element SW2. Consequently, the voltage applied to the gate terminal of the switching element SW1 decreases and the switching element SW1 is thereby turned off. Therefore, the output voltage from the resonance circuit 60 is not applied to the resistor R1.

On the other hand, since, while the adjustment of the switching frequency in order for the non-contact power supply device 4 to perform the constant voltage output operation is being carried out, the voltage of power supplied from the DC/DC converter 52 to the transmission coil 54 is low, the power supplied from the power transmission device 42 to the power reception device 43 also decreases. Therefore, the output voltage from the resonance circuit 60 also decreases to a voltage lower than the breakdown voltage of the Zener diode ZD. As a result, the switching element SW2 is turned off, and, in association therewith, the voltage applied to the gate terminal of the switching element SW1 increases and the switching element SW1 is thereby turned on. Thus, the output voltage from the resonance circuit 60 is applied to the resistor R1. As a result, a fixed load that the resistor R1 has is provided to the power reception device 43.

Operation of the control circuit 59 of the power transmission device 42 according to the variation will be described below. While the non-contact power supply device 4 is performing the constant voltage output operation, the control circuit 59, as with the above-described embodiment, controls the voltage variable power supply 51 of the power supply circuit 50 to supply the transmission coil 54 with DC voltage having a voltage in accordance with switching frequency in such a way that a measured value of the output voltage from the resonance circuit 60 of the power reception device 43 falls within a predetermined allowance range. In addition, the control circuit 59 keeps the switching element 53-3 in the off state and, in conjunction therewith, switches the switching elements 53-1 and 53-2 between on and off states at a switching frequency at which the constant voltage output operation is performed, via the gate driver 58.

On the other hand, when determination information included in a wireless signal received from the power reception device 43 via the receiver 57 indicates that the non-contact power supply device 4 is not performing the constant voltage output operation, the control circuit 59 keeps the switching element 53-1 in the off state and, in conjunction therewith, alternately switches the switching elements 53-3 and 53-2 between on and off states via the gate driver 58 and thereby causes power to be supplied from the DC/DC converter 52 to the transmission coil 54. In addition, the control circuit 59 controls the voltage variable power source 51 in such a way that the voltage supplied from the DC/DC converter 52 to the transmission coil 54 has a predetermined value. Through this control, the control circuit 59 reduces the power supplied from the power transmission device 42 to the power reception device 43 to a level at which voltage is applied to the resistor R1 of the fixed load circuit 72 of the power reception device 43.

The control circuit 59 monitors measured values of current flowing through the transmission coil 54 measured by a current detection circuit 56 while the switching frequency is changed and detects a switching frequency at which the measured values of the current have a local maximum. The switching frequency at which measured values of the current flowing through the transmission coil 54 have a local maximum is a frequency at which the input impedance of the non-contact power supply device 4 has a local minimum value, i.e., a frequency at which the non-contact power supply device 4 performs constant voltage output operation, such as the frequency f0 illustrated in FIG. 15. Thus, when a switching frequency at which measured values of the current flowing through the transmission coil 54 have a local maximum is detected, the control circuit 59 controls switching of the switching elements 53-1 and 53-2 between on and off states via the gate driver 58 at the switching frequency in such a way that power from the voltage variable power source 51 is supplied to the transmission coil 54. In addition, the control circuit 59 turns off the switching element 53-3. This operation enables the control circuit 59 to make the non-contact power supply device 4 perform the constant voltage output operation. In addition, as described above, the control circuit 59 controls the voltage variable power supply 51 of the power supply circuit 50 to supply the transmission coil 54 with DC voltage having a voltage in accordance with the switching frequency in such a way that measured values of the output voltage from the resonance circuit 60 of the power reception device 43 fall within a predetermined allowance range.

Note that, when a foreign object made of metal has intruded between the transmission coil 54 and the reception coil 61, the non-contact power supply device 4 ceases to perform a constant voltage output operation and, as a result, a local minimum value of the input impedance as illustrated by the graph 1511 in the lower side diagram in FIG. 15 disappears. In other words, the input impedance comes to, for example, monotonically increase in response to increase in the switching frequency. Therefore, when no switching frequency at which measured values of current flowing through the transmission coil 54, measured by the current detection circuit 56, have a local maximum is detected even if measured values of the current are monitored at the time of adjustment of the switching frequency, it is determined that a foreign object made of metal has intruded between the transmission coil 54 and the reception coil 61.

Thus, according to the variation, in step S103 in the operation flowchart in FIG. 8, the control circuit 59 may determine that the non-contact power supply device 4 is performing a constant voltage output operation when a switching frequency at which measured values of the current flowing through the transmission coil 54, measured by the current detection circuit 56, have a local maximum is detected. Conversely, the control circuit 59 may determine that the non-contact power supply device 4 is not performing the constant voltage output operation and a foreign object made of metal has intruded between the transmission coil 54 and the reception coil 61 when no switching frequency at which measured values of the current flowing through the transmission coil 54, measured by the current detection circuit 56, have a local maximum is detected.

Note that, in the variation, the control circuit 59 may also determine whether or not a foreign object made of metal has intruded between the transmission coil 54 and the reception coil 61 in accordance with the operation flowchart illustrated in FIG. 10.

Note that the non-contact power supply device illustrated in FIG. 16 may, as with the non-contact power supply device illustrated in FIG. 5, also be configured in accordance with the SPL method or the SL method.

According to the variation, the control circuit of the power transmission device is capable of detecting a switching frequency at which the non-contact power supply device performs the constant voltage output operation by monitoring current flowing through the transmission coil of the power transmission device and, in conjunction therewith, detecting that a foreign object made of metal has intruded between the transmission coil and the reception coil.

Further, according to another variation, in the resonance circuit of the power reception device, the reception coil and the resonance capacitor may be connected in series with each other, as with the non-contact power supply device according to the SS method. In this case, since the non-contact power supply device can perform a constant voltage output operation, the non-contact power supply device, as with the above-described embodiment or any of its variations, is also capable of detecting a switching frequency at which the non-contact power supply device performs the constant voltage output operation and, in conjunction therewith, detecting that a foreign object made of metal has intruded between the transmission coil and the reception coil.

Figure 17:
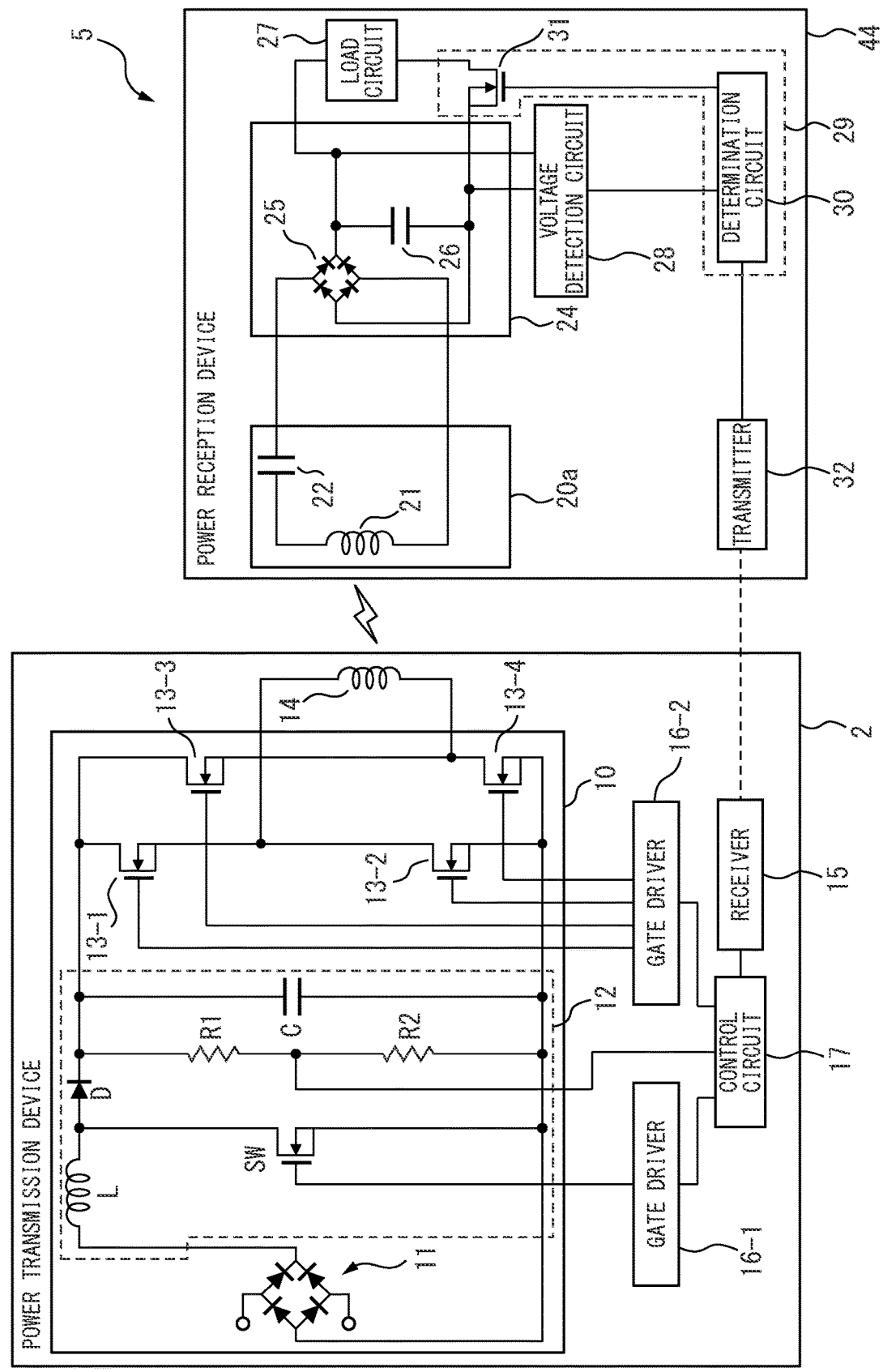
FIG. 17 is a schematic configuration view of a non-contact power supply device according to another variation.

FIG. 17 is a schematic configuration view of a non-contact power supply device according to the variation. As illustrated in FIG. 17, a non-contact power supply device 5 according to the variation includes a power transmission device 2 and a power reception device 44 to which power is transmitted from the power transmission device 2 through space without contact. The power transmission device 2 includes a power supply circuit 10, a transmission coil 14, a receiver 15, gate drivers 16-1 and 16-2, and a control circuit 17. On the other hand, the power reception device 44 includes a resonance circuit 20a that includes a reception coil 21 and a resonance capacitor 22, a rectification and smoothing circuit 24, a load circuit 27, a voltage detection circuit 28, a constant voltage determination circuit 29, and a transmitter 32. The non-contact power supply device 5 according to the variation differs from the non-contact power supply device 1 illustrated in FIG. 5 in the configuration of the resonance circuit 20a and in that the coil 23 is omitted. Therefore, the above-described differences and related matters will be described below.

In the resonance circuit 20a, the reception coil 21 and resonance capacitor 22 are connected in series with each other. Power received via the reception coil 21 is output to the rectification and smoothing circuit 24 via the resonance capacitor 22. Since, as described above, the non-contact power supply device 5 has a similar configuration to that of the SS method, the non-contact power supply device 5 is capable of performing a constant voltage output operation. In addition, in the variation, since, differing from the non-contact power supply device according to the SPL method, the resonance circuit 20a performs series resonance, the coil 23 can be omitted. Note that, differing from the SS method, the non-contact power supply device 5 does not have to use resonance of the transmission coil 14 on the power transmission side. In other words, the control circuit 17 of the power transmission device 2 may, as with the above-described embodiment, control the power supply circuit 10 to supply the transmission coil 14 with AC power having a switching frequency at which the transmission coil 14 does not resonate.

Figure 18:
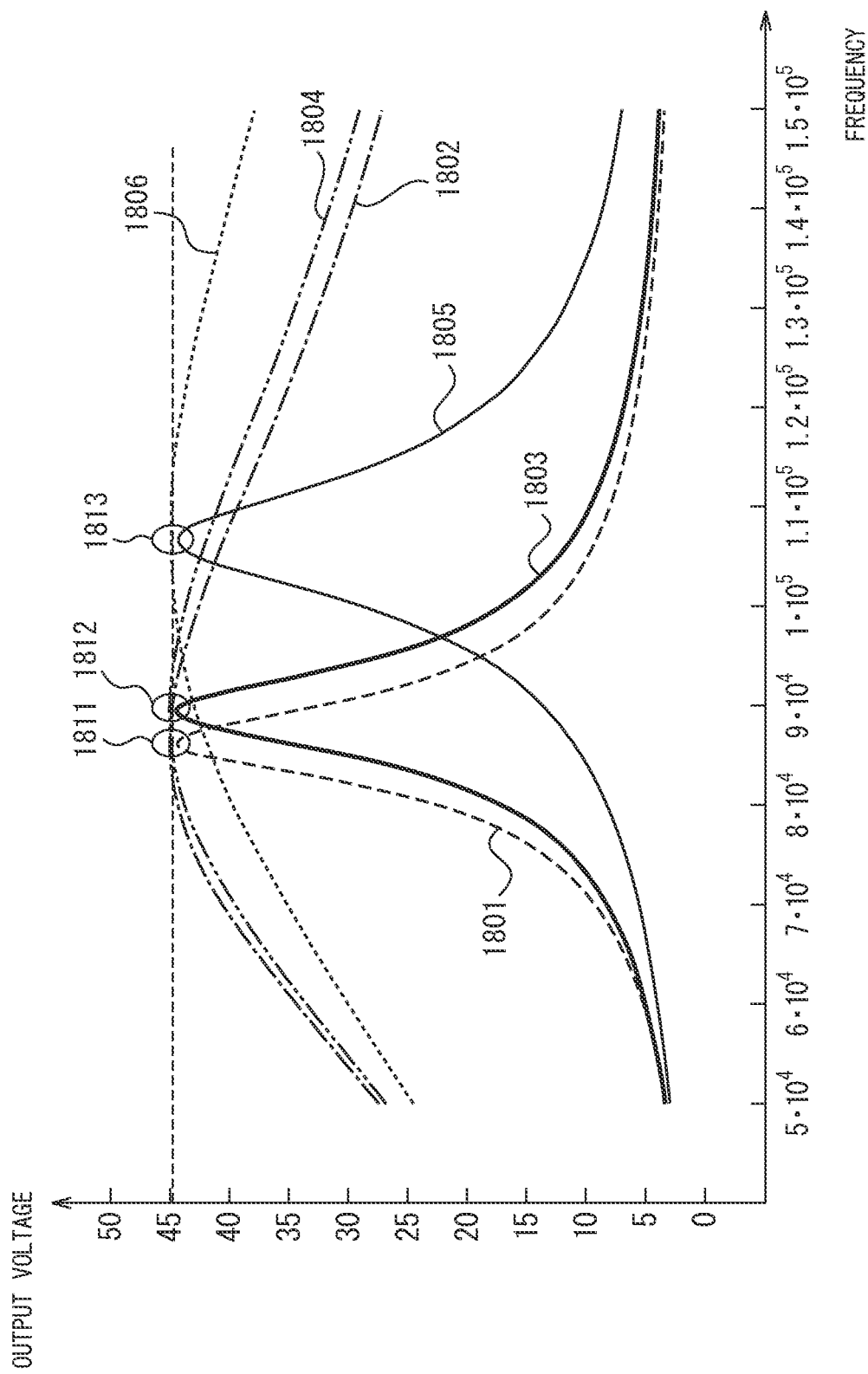
FIG. 18 is a diagram illustrating an example of simulation results of frequency responses of output voltage when voltage applied to the transmission coil is changed in accordance with the coupling coefficient, with respect to the non-contact power supply device according to the variation illustrated in FIG. 17.

FIG. 18 is a diagram illustrating an example of simulation results of frequency responses of output voltage when voltage applied to the transmission coil 14 is changed according to the coupling coefficient, with respect to the non-contact power supply device 5 according to the variation. In FIG. 18, frequency is plotted along the horizontal axis and output voltage is plotted along the vertical axis. Note that, in the simulation, it is assumed that Lp=174 µH, Cp=20 nF, Ri=Ris=0.1Ω, n=1, Vin=300 V, and Ro=10Ω (Rac=8.1Ω). Graph 1801 represents a frequency response of the output voltage when the coupling coefficient k is set as k=0.15, the AC equivalent resistance of the load circuit 27 is set at Rac, and the voltage applied to the transmission coil 14 is set at Vin. In addition, graph 1802 represents a frequency response of the output voltage when the coupling coefficient k is set as k=0.15, the AC equivalent resistance of the load circuit 27 is set at (10*Rac), and the voltage applied to the transmission coil 14 is set at Vin. In addition, graph 1803 represents a frequency response of the output voltage when the coupling coefficient k is set as k=0.3, the AC equivalent resistance of the load circuit 27 is set at Rac, and the voltage applied to the transmission coil 14 is set at (0.5*Vin). In addition, graph 1804 represents a frequency response of the output voltage when the coupling coefficient k is set as k=0.3, the AC equivalent resistance of the load circuit 27 is set at (10*Rac), and the voltage applied to the transmission coil 14 is set at (0.5*Vin). Further, graph 1805 represents a frequency response of the output voltage when the coupling coefficient k is set as k=0.6, the AC equivalent resistance of the load circuit 27 is set at Rac, and the voltage applied to the transmission coil 14 is set at (0.25*Vin). Moreover, graph 1806 represents a frequency response of the output voltage when the coupling coefficient k is set as k=0.6, the AC equivalent resistance of the load circuit 27 is set at (10*Rac), and the voltage applied to the transmission coil 14 is set at (0.25*Vin).

As illustrated by points 1811 to 1813 in FIG. 18, in the variation, there also exists, for each value of the coupling coefficient, a combination of a frequency and an output voltage at which the output voltage becomes substantially constant (i.e., a constant voltage is output) even when the AC equivalent resistance of the load circuit 27 changes under the condition that the coupling coefficient k does not change. The output voltages at the respective points 1811 to 1813 are substantially equal to one another.

As described above, it is clear that, with respect to the non-contact power supply device 5, unless a foreign object has intruded between the transmission coil 14 and the reception coil 21, appropriately adjusting the switching frequency and voltage of the AC power applied to the transmission coil 14 also enables the output voltage to be maintained substantially constant even when either the resistance of the load circuit 27 or the coupling coefficient changes.

Figure 19:
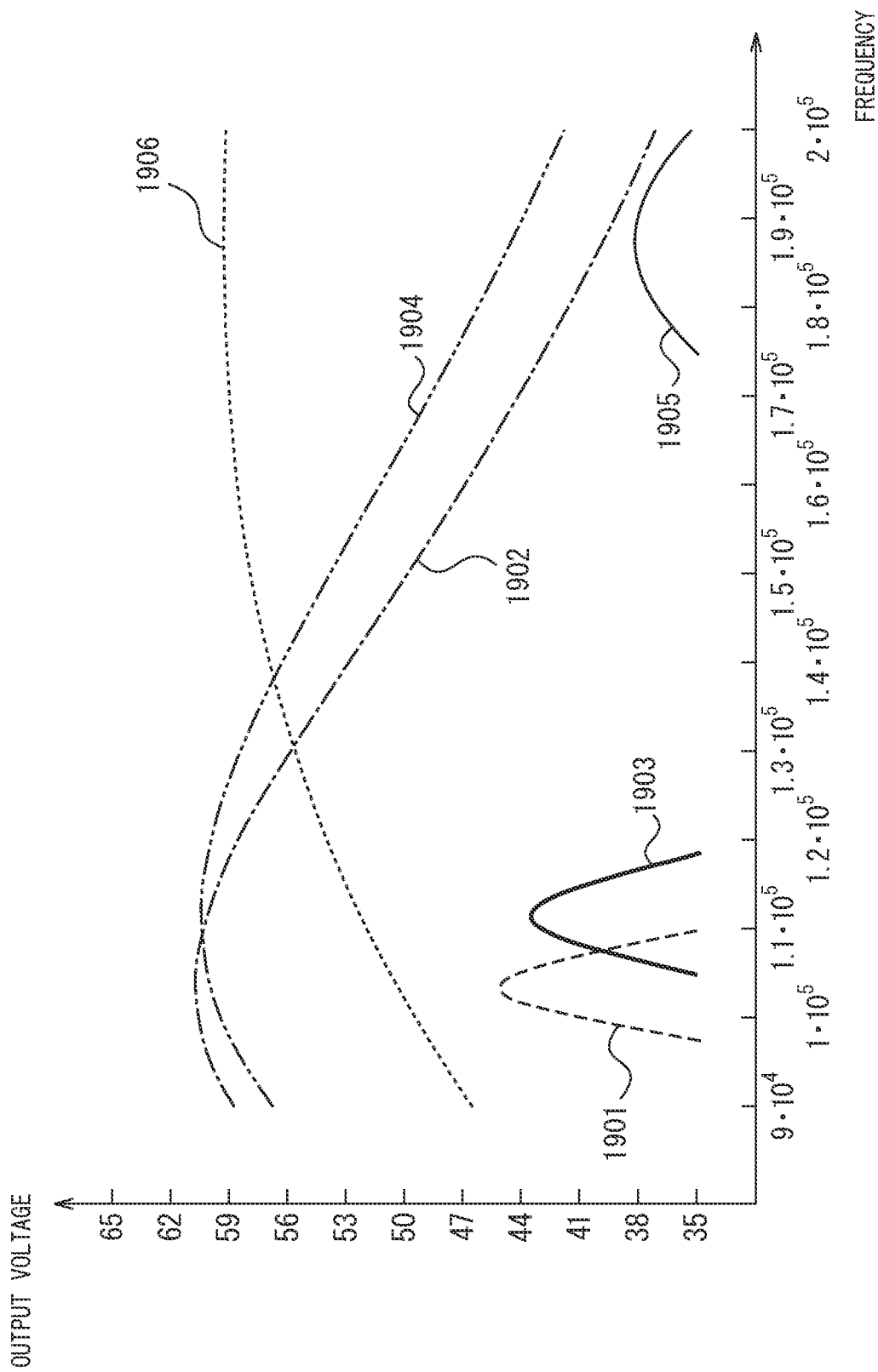
FIG. 19 is a diagram illustrating an example of simulation results of frequency responses of the output voltage with respect to the non-contact power supply device according to the variation illustrated in FIG. 17 at the time of intrusion of a foreign object.

FIG. 19 is a diagram illustrating an example of simulation results of frequency responses of output voltage with respect to the non-contact power supply device 5 at the time of intrusion of a foreign object. In FIG. 19, frequency is plotted along the horizontal axis and output voltage is plotted along the vertical axis. Graph 1901 represents a frequency response of the output voltage at the time of intrusion of a foreign object when the coupling coefficient k is set as k=0.15, the AC equivalent resistance of the load circuit 27 is set at Rac, and the voltage applied to the transmission coil 14 is set at Vin. In addition, graph 1902 represents a frequency response of the output voltage when the coupling coefficient k is set as k=0.15, the AC equivalent resistance of the load circuit 27 is set at (10*Rac), and the voltage applied to the transmission coil 14 is set at Vin. In addition, graph 1903 represents a frequency response of the output voltage when the coupling coefficient k is set as k=0.3, the AC equivalent resistance of the load circuit 27 is set at Rac, and the voltage applied to the transmission coil 14 is set at (0.5*Vin). In addition, graph 1904 represents a frequency response of the output voltage when the coupling coefficient k is set as k=0.3, the AC equivalent resistance of the load circuit 27 is set at (10*Rac), and the voltage applied to the transmission coil 14 is set at (0.5*Vin). Further, graph 1905 represents a frequency response of the output voltage when the coupling coefficient k is set as k=0.6, the AC equivalent resistance of the load circuit 27 is set at Rac, and the voltage applied to the transmission coil 14 is set at (0.25*Vin). Moreover, graph 1906 represents a frequency response of the output voltage when the coupling coefficient k is set as k=0.6, the AC equivalent resistance of the load circuit 27 is set at (10*Rac), and the voltage applied to the transmission coil 14 is set at (0.25*Vin). Note that, in the example, in order to represent influence from intrusion of a foreign object, the values of the parameters used in the simulation in FIG. 18 except the value of the leakage inductance Lr, which is decreased by 50 µH from that in the simulation in FIG. 18, and the winding resistance Ri on the power transmission side and the winding resistance Ris on the power reception side, which are respectively increased by 3Ω from those in the simulation in FIG. 18, were used as parameters of the respective circuit elements.

As illustrated in FIG. 19, it is revealed that, at any of the coupling coefficients, the output voltage substantially varies due to variation in the AC equivalent resistance of the load circuit 27 and the non-contact power supply device 5 ceases to perform a constant voltage output operation. Further, it is revealed that the intrusion of a foreign object causes the waveforms of the output voltage to shift to the high frequency side without depending on the coupling coefficient.

Therefore, the non-contact power supply device 5 is also capable of determining whether or not a foreign object made of metal has intruded between the transmission coil 14 and the reception coil 21 by the control circuit 17 of the power transmission device 2 performing the abnormal stop processing in accordance with the operation flowchart illustrated in FIG. 8 or 10 and stopping power transmission from the power transmission device 2 to the power reception device 44 when determining that a foreign object made of metal has intruded.

Note that, in the non-contact power supply device 5, the power transmission device 2 may include a capacitor that is connected in series with the transmission coil 14 and the control circuit 17 may control the power supply circuit 10 in such a way that AC power having a switching frequency at which a resonance circuit constituted by the transmission coil 14 and the capacitor resonates is supplied to the transmission coil 14. In this case, the non-contact power supply device 5 operates as a non-contact power supply device according to the SS method. In this case, the control circuit 17 is also capable of determining whether or not a foreign object made of metal has intruded between the transmission coil 14 and the reception coil 21 by performing the abnormal stop processing in accordance with the operation flowchart illustrated in FIG. 8 or 10 and stopping power transmission from the power transmission device 2 to the power reception device 44 when determining that a foreign object made of metal has intruded.

Further, in the non-contact power supply device 4 illustrated in FIG. 16, as with the non-contact power supply device 5, the power reception device 43 may include, in place of the resonance circuit 60 in which the reception coil 61 and the resonance capacitor 62 are connected in parallel with each other, a resonance circuit in which a reception coil and a resonance capacitor are connected in series with each other. The coil 63 that is connected between the resonance circuit and the rectification and smoothing circuit 64 may be omitted. In this case, the non-contact power supply device also performs a constant voltage output operation when no foreign object has intruded between the transmission coil and the reception coil and ceases to perform the constant voltage output operation when a foreign object has intruded between the transmission coil and the reception coil. Thus, the control circuit 59 of the power transmission device 42 is capable of determining whether or not a foreign object made of metal has intruded between the transmission coil and the reception coil by performing abnormal stop processing similar to that performed by the non-contact power supply device 4 illustrated in FIG. 16 and stopping power transmission from the power transmission device 42 to the power reception device 43 when determining that a foreign object made of metal has intruded.

Further, according to another variation, in the power transmission device, the power supply circuit that supplies AC power to the transmission coil may have a circuit configuration different from that in the above-described embodiment and its variations as long as the power supply circuit is a circuit that can variably adjust the switching frequency and voltage applied to the transmission coil.

Figure 20A:
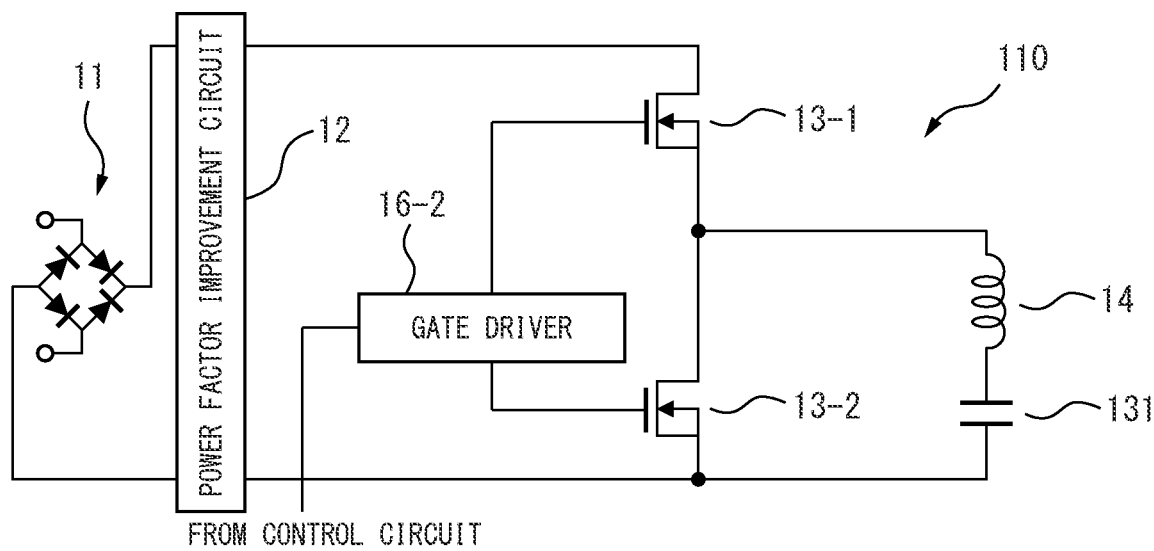
FIG. 20A is a circuit diagram of a power supply circuit according to a variation.
Figure 20B:
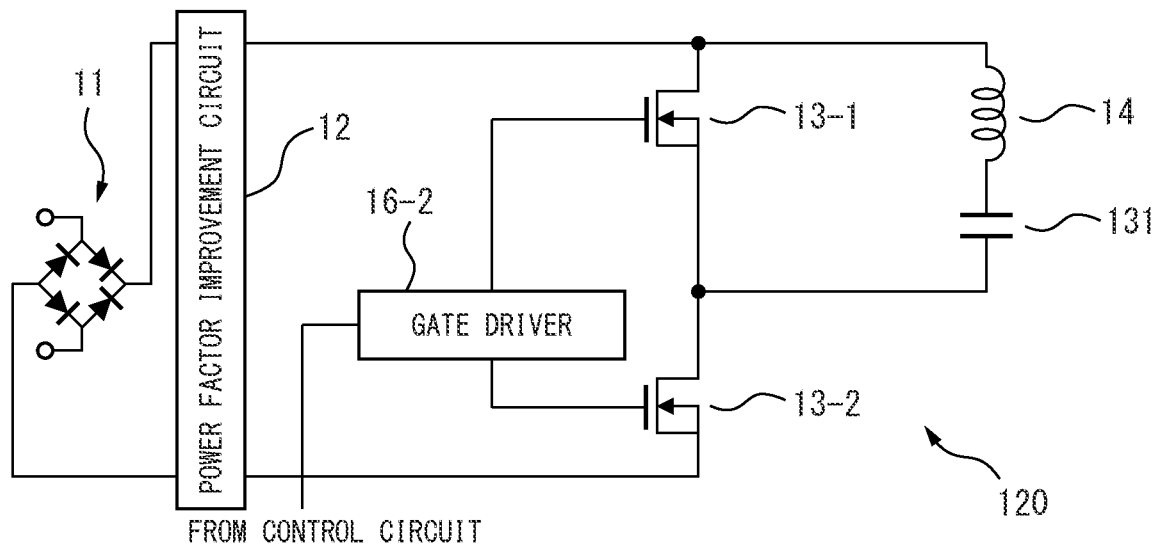
FIG. 20B is a circuit diagram of a power supply circuit according to another variation.

FIGS. 20A and 20B are respectively circuit diagrams of power supply circuits according to the variation.

A power supply circuit 110 illustrated in FIG. 20A includes a power source 11, a power factor improvement circuit 12, two switching elements 13-1 and 13-2, and a capacitor 131 for blocking DC current that is connected in series with a transmission coil 14. Note that, for the switching elements, for example, n-channel MOSFETs can also be used in this variation. In addition, the power factor improvement circuit 12 can be, for example, configured identical to the power factor improvement circuit 12 in the above-described embodiment.

In this variation, the switching element 13-1 and the switching element 13-2 are connected in series between the positive electrode terminal and negative electrode terminal of the power source 11. In addition, the switching element 13-1 is connected to the positive electrode side of the power source 11, whereas the switching element 13-2 is connected to the negative electrode side of the power source 11. The drain terminal of the switching element 13-1 is connected to the positive electrode terminal of the power source 11 via the power factor improvement circuit 12, and the source terminal of the switching element 13-1 is connected to the drain terminal of the switching element 13-2. In addition, the source terminal of the switching element 13-2 is connected to the negative electrode terminal of the power source 11 via the power factor improvement circuit 12. Further, the source terminal of the switching element 13-1 and the drain terminal of the switching element 13-2 are connected to one end of the transmission coil 14, and the source terminal of the switching element 13-2 is connected to the other end of the transmission coil 14 via the capacitor 131. In addition, the gate terminals of the switching elements are connected to a gate driver 16-2.

In this variation, the gate driver 16-2 may alternately switch the switching element 13-1 and the switching element 13-2 between on and off states in accordance with a control signal from a control circuit 17. In other words, when the switching element 13-1 is turned on and the switching element 13-2 is turned off, current flows from the power source 11 to the transmission coil 14 via the power factor improvement circuit 12 and the switching element 13-1 and the capacitor 131 is charged. On the other hand, when the switching element 13-1 is turned off and the switching element 13-2 is turned on, the capacitor 131 is discharged and current flows from the capacitor 131 via the transmission coil 14 and the switching element 13-2. In this variation, therefore, the control circuit 17 may control the switching frequency at which the switching element 13-1 and the switching element 13-2 are switched between on and off states via the gate driver 16-2 depending on determination information received from a power reception device 3.

A power supply circuit 120 illustrated in FIG. 20B, as with the power supply circuit 110, includes a power source 11, a power factor improvement circuit 12, two switching elements 13-1 and 13-2, and a capacitor 131 connected in series with a transmission coil 14. Note that, in the power supply circuit 120, compared with the power supply circuit 110, one end of the transmission coil 14 is connected to the positive electrode terminal of the power source 11 via the power factor improvement circuit 12 and the other end of the transmission coil 14 is connected to the source terminal of the switching element 13-1 and the drain terminal of the switching element 13-2 via the capacitor 131.

In this variation, the gate driver 16-2 may also alternately switch the switching element 13-1 and the switching element 13-2 between on and off states in accordance with a control signal from a control circuit 17.

In addition, in the embodiment illustrated in FIG. 5, the variation illustrated in FIG. 17, and the variations illustrated in FIGS. 20A and 20B, a voltage variable power source may be used in place of the power source and the power factor improvement circuit, as illustrated in FIG. 16. Conversely, in the variation illustrated in FIG. 16, the power source and the power factor improvement circuit in the embodiment illustrated in FIG. 5 may be used in place of the voltage variable power source. Further, in the variation illustrated in FIG. 16, the voltage variable power source 51 may be configured in such a manner as to be able to supply the transmission coil 54 with power having a predetermined voltage while the switching frequency is adjusted. In this case, the DC/DC converter 52 and the switching element 53-3 may be omitted.

In addition, in the above-described embodiment or any of the respective variations thereof, when it is possible to connect the receiver of the power transmission device and the transmitter of the power reception device to each other in a wired manner, each of the receiver and the transmitter may include a communication circuit capable of communicating a signal including determination information in a wired manner.

As explained above, a person skilled in the art could apply various alterations suitable to embodiments without departing from the scope of the present invention.

REFERENCE SIGNS LIST 1, 4, 5 Non-contact power supply device
2, 42 Power transmission device
10, 110, 120 Power supply circuit
11 Power source
12 Power factor improvement circuit
51 Voltage variable power source
52 DC/DC converter
13-1 to 13-4, 53-1 to 53-3 Switching element 14, 54 Transmission coil
55 Capacitor
56 Current detection circuit
15, 57 Receiver
16-1, 16-2, 58 Gate driver
17, 59 Control circuit
3, 43, 44 Power reception device
20, 20a, 60 Resonance circuit
21, 61 Reception coil
22, 62 Resonance capacitor
23, 63 Coil
24, 64 Rectification and smoothing circuit
25, 65 Full-wave rectification circuit
26, 66 Smoothing capacitor
27, 67 Load circuit
28, 68 Voltage detection circuit
29, 69 Constant voltage determination circuit
30, 70 Determination circuit
31, 71 Switching element
72 Fixed load circuit
32, 73 Transmitter
111 AC power source
131 Capacitor

The invention claimed is:

1. A non-contact power supply device comprising a power transmission device and a power reception device to which power is transmitted from the power transmission device without contact, wherein the power reception device comprises:
a reception circuit that includes a reception coil that receives power from the power transmission device;
a rectification circuit that rectifies power output from the reception circuit;
a voltage detection circuit that measures output voltage of power output from the reception circuit and obtains a measured value of the output voltage;
a constant voltage determination circuit that includes a switching element that is connected between the rectification circuit and a circuit connected to the rectification circuit; and
a transmitter that transmits a signal including determination information indicating whether or not the non-contact power supply device is performing a constant voltage output operation and whether or not the measured value of the output voltage falls within a predetermined allowance range of voltage to the power transmission device, and the power transmission device comprises:
a transmission coil that supplies power to the power reception device;
a receiver that receives the signal including the determination information;
a power supply circuit that supplies AC power having an adjustable switching frequency to the transmission coil; and
a control circuit that:
detects a specific frequency of the AC power at which the non-contact power supply device performs a constant voltage output operation by changing the adjustable switching frequency over a predetermined frequency range,
keeps the adjustable switching frequency as the specific frequency when the specific frequency is detected, and
stops power supply from the power supply circuit to the transmission coil when the specific frequency is not detected, wherein the constant voltage output operation is an operation at which an output voltage from the power reception device becomes substantially constant even when resistance of a circuit connected to the rectification circuit is changed,
wherein the specific frequency depends on a coupling coefficient between the transmission coil and the reception coil,
wherein the control circuit stops power supply from the power supply circuit to the transmission coil when the control circuit does not receive the determination information indicating that the non-contact power supply device is performing the constant voltage output operation even when switching frequency of the AC power supplied from the power supply circuit to the transmission coil is changed over the predetermined frequency range, and
wherein the constant voltage determination circuit determines, based upon the measured value of the output voltage, whether or not the non-contact power supply device is performing the constant voltage output operation by switching the switching element between on and off states at a predetermined period while the adjustable switching frequency of the AC power supplied from the power supply circuit to the transmission coil is changed, and determines whether or not the measured value of the output voltage from the reception circuit falls within the predetermined allowance range of voltage.

2. The non-contact power supply device according to claim 1,
wherein the power reception device further comprises a coil that is connected between the reception circuit and the rectification circuit in series with the reception coil,
the reception circuit of the power reception device further includes a resonance capacitor that is connected in parallel with the reception coil, and
the control circuit of the power transmission device controls the power supply circuit in such a way that AC power having a switching frequency is supplied to the transmission coil.

3. The non-contact power supply device according to claim 1, wherein the reception circuit of the power reception device further includes a resonance capacitor that is connected in series with the reception coil.

4. The non-contact power supply device according to claim 1,
wherein the constant voltage determination circuit of the power reception device calculates a change amount of measured values of the output voltage during a lapse of a predetermined period of time,
the transmitter of the power reception device includes the change amount of measured values of the output voltage in the determination information, and
the control circuit of the power transmission device stops power supply from the power supply circuit to the transmission coil when the change amount of measured values of the output voltage included in the determination information indicates that the measured values of the output voltage increase when switching frequency of the AC power supplied from the power supply circuit to the transmission coil is changed in such a way as to be raised by a predetermined amount.

5. The non-contact power supply device according to claim 1, wherein the constant voltage determination circuit determines that the non-contact power supply device is performing the constant voltage output operation when measured values of the output voltage become substantially constant even when resistance of the circuit connected to the rectification circuit is changed.

6. A non-contact power supply device comprising a power transmission device and a power reception device to which power is transmitted from the power transmission device without contact,
   wherein the power reception device comprises:
      a reception circuit that includes a reception coil that receives power from the power transmission device; and
      a rectification circuit that rectifies power output from the reception circuit, and
   wherein the power transmission device comprises:
      a transmission coil that supplies power to the power reception device;
      a power supply circuit that supplies AC power having an adjustable switching frequency to the transmission coil;
      a control circuit that detects a specific frequency of the AC power at which the non-contact power supply device performs a constant voltage output operation by changing the adjustable switching frequency over a predetermined frequency range, keeps the adjustable switching frequency as the specific frequency when the specific frequency is detected, and stops power supply from the power supply circuit to the transmission coil when the specific frequency is not detected, and
      current detection circuit that measures current flowing through the transmission coil and obtains a measured value of the current;
   wherein the control circuit monitors the measured values of the current while changing the adjustable switching frequency over the predetermined frequency range, detects a switching frequency at which measured values of the current have a local maximum as the specific frequency, and stops power supply from the power supply circuit to the transmission coil when the specific frequency is not detected;
   wherein the constant voltage output operation is an operation at which an output voltage from the power reception device becomes substantially constant even when resistance of a circuit connected to the rectification circuit is changed and the specific frequency depends on a coupling coefficient between the transmission coil and the reception coil.

7. A method for abnormal stop in a non-contact power supply device comprising a power transmission device and a power reception device to which power is transmitted from the power transmission device without contact,
   wherein the power reception device comprises:
      a reception circuit that includes a reception coil that receives power from the power transmission device;
      a rectification circuit that rectifies power output from the reception circuit;
      a voltage detection circuit that measures output voltage of power output from the reception circuit and obtains a measured value of the output voltage;
      a constant voltage determination circuit that includes a switching element that is connected between the rectification circuit and a circuit connected to the rectification circuit; and
      a transmitter that transmits a signal including determination information indicating whether or not the non-contact power supply device is performing a constant voltage output operation and whether or not the measured value of the output voltage falls within a predetermined allowance range of voltage to the power transmission device, and
   the power transmission device comprises:
      a receiver that receives the signal including the determination information;
      a transmission coil that supplies power to the power reception device; and
      a power supply circuit that supplies AC power having an adjustable switching frequency to the transmission coil,
   the method for abnormal stop comprising:
      detecting a specific frequency of the AC power at which the non-contact power supply device performs the constant voltage output operation by changing switching frequency of the AC power supplied from the power supply circuit to the transmission coil over a predetermined frequency range;
      keeping the switching frequency as the specific frequency when the specific frequency is detected; and
      stopping power supply from the power supply circuit to the transmission coil when the specific frequency is not,
   wherein the constant voltage output operation is an operation at which an output voltage from the power reception device becomes substantially constant even when resistance of a circuit connected to the rectification circuit is changed; and
   wherein the specific frequency depends on a coupling coefficient between the transmission coil and the reception coil,
   wherein a control circuit stops power supply from the power supply circuit to the transmission coil when the control circuit does not receive the determination information indicating that the non-contact power supply device is performing the constant voltage output operation even when switching frequency of the AC power supplied from the power supply circuit to the transmission coil is changed over the predetermined frequency range, and
   wherein the constant voltage determination circuit determines, based upon the measured value of the output voltage, whether or not the non-contact power supply device is performing the constant voltage output operation by switching the switching element between on and off states at a predetermined period while the switching frequency of the AC power supplied from the power supply circuit to the transmission coil is changed, and determines whether or not the measured value of the output voltage from the reception circuit falls within the predetermined allowance range of voltage.

8. A method for abnormal stop in a non-contact power supply device comprising a power transmission device and a power reception device to which power is transmitted from the power transmission device without contact,
   wherein the power reception device comprises:
      a reception circuit that includes a reception coil that receives power from the power transmission device; and
      a rectification circuit that rectifies power output from the reception circuit, and
   wherein the power transmission device comprises:
      a transmission coil that supplies power to the power reception device;

a power supply circuit that supplies AC power having an adjustable switching frequency to the transmission coil, and a current detection circuit that measures current flowing through the transmission coil and obtains a measured value of the current;

the method for abnormal stop comprising:

detecting a specific frequency of the AC power at which the non-contact power supply device performs a constant voltage output operation by changing a switching frequency of the AC power supplied from the power supply circuit to the transmission coil over a predetermined frequency range;

keeping the switching frequency as the specific frequency when the specific frequency is detected; and stopping power supply from the power supply circuit to the transmission coil when the specific frequency is not detected, wherein the constant voltage output operation is an operation at which an output voltage from the power reception device becomes substantially constant even when resistance of a circuit connected to the rectification circuit is changed and the specific frequency depends on a coupling coefficient between the transmission coil and the reception coil, wherein a control circuit monitors the measured values of the current while changing the switching frequency over the predetermined frequency range, detects the switching frequency at which measured values of the current have a local maximum as the specific frequency, and stops power supply from the power supply circuit to the transmission coil when the specific frequency is not detected.

* * * * *